US007752327B2

(12) United States Patent
Li

(10) Patent No.: US 7,752,327 B2
(45) Date of Patent: Jul. 6, 2010

(54) RECEIVER DRIVEN STREAMING IN A PEER-TO-PEER NETWORK

(75) Inventor: Jin Li, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 203 days.

(21) Appl. No.: 11/671,434

(22) Filed: Feb. 5, 2007

(65) Prior Publication Data

US 2007/0130360 A1    Jun. 7, 2007

Related U.S. Application Data

(62) Division of application No. 10/951,482, filed on Sep. 28, 2004, now Pat. No. 7,174,385, and a division of application No. 10/934,823, filed on Sep. 3, 2004.

(51) Int. Cl.
*G06F 15/16* (2006.01)
(52) U.S. Cl. .................. 709/231; 709/203; 709/227; 709/228
(58) Field of Classification Search ......... 709/202–203, 709/227–228, 231–232
See application file for complete search history.

(56) References Cited

U.S. PATENT DOCUMENTS

| | | | | |
|---|---|---|---|---|
| 6,789,123 B2 * | 9/2004 | Li et al. | ....................... | 709/231 |
| 7,010,598 B2 * | 3/2006 | Sitaraman et al. | ........... | 709/231 |
| 7,062,567 B2 * | 6/2006 | Benitez et al. | .............. | 709/231 |
| 7,099,926 B1 * | 8/2006 | Ims et al. | ..................... | 709/228 |
| 7,249,264 B2 * | 7/2007 | Belknap et al. | ............. | 713/189 |
| 7,440,994 B2 * | 10/2008 | Harrow et al. | .............. | 709/203 |
| 7,581,158 B2 * | 8/2009 | Alstrup et al. | .............. | 709/231 |
| 7,647,413 B2 * | 1/2010 | Kirkland | ..................... | 709/231 |
| 2002/0059274 A1 * | 5/2002 | Hartsell et al. | .............. | 707/100 |
| 2003/0204613 A1 * | 10/2003 | Hudson et al. | ............. | 709/231 |

* cited by examiner

*Primary Examiner*—Bharat N Barot
(74) *Attorney, Agent, or Firm*—Lyon & Harr, LLP; Mark A. Watson

(57) ABSTRACT

A "PeerStreamer" provides receiver-driven peer-to-peer (P2P) media streaming for loosely coupled P2P networks. Peers in the network perform only simple operations, may cache all or part of the streaming media, do not collaborate with other peers, may be unreliable, and may drop offline or come online during any given streaming session. Clients in the network operate in real-time to coordinate peers, stream media from multiple peers, perform load balancing, handle online/offline states of peers, and perform decoding and rendering the streaming media. In one embodiment, the PeerStreamer uses high rate erasure resilient coding to allow multiple serving peers to hold partial media without conflict, such that clients simply retrieve fixed numbers of erasure coded blocks regardless of where and what specific blocks are retrieved. In another embodiment, the PeerStreamer uses embedded coded media to vary streaming bitrates according to available serving bandwidths and client queue status.

20 Claims, 8 Drawing Sheets

RECEIVER DRIVEN STREAMING IN A PEER-TO-PEER NETWORK

CROSS REFERENCE TO RELATED APPLICATIONS

This application is a divisional application of U.S. patent application Ser. No. 10/951,482, filed on Sep. 28, 2004, by Jin Li and entitled "A SYSTEM AND METHOD FOR DISTRIBUTED STREAMING OF SCALABLE MEDIA," which is a further divisional application of U.S. patent application Ser. No. 10/934,823, filed on Sep. 3, 2004, by Jin Li and entitled "A SYSTEM AND METHOD FOR RECEIVER DRIVEN STREAMING IN A PEER-TO-PEER NETWORK."

BACKGROUND

1. Technical Field

The invention is related to receiver-driven peer-to-peer (P2P) media streaming for loosely coupled P2P networks, and in particular, to a system and method for streaming media from a plurality of peers to a client under the real-time coordination and control of the client without the need to provide peer-to-peer collaboration.

2. Related Art

Recent market research has indicated that over half of the Internet users in the United States have accessed some form of streaming media in 2004. Access to streaming music is a very popular activity, while the popularity of streaming video is growing rapidly.

Unfortunately, unlike typical web pages, a streaming media file is typically extremely large in size. For example, a 3 minute movie trailer encoded at 2 megabits per second (Mbps) can result in a 45 megabyte (MB) media file depending upon the codec used. Another problem that must be addressed by streaming media is the critical timing of packet delivery. Consequently, the large size of the streaming media files and the packet delivery timing requirements cause typical streaming media servers to be relatively expensive to set up and run. For example, one current estimate puts the going rate for streaming media at $10 per 1 GB of serving traffic. Using the example of a 45 MB file size, this can result in a bandwidth cost of $0.45 per movie trailer distributed. Clearly such costs can escalate rapidly as the amount of media streaming increases.

One solution to the relatively high cost of media streaming is to use a "peer-to-peer" (P2P) network to provide the media streaming to individual clients. In general, the basic idea of P2P networks is to allow each peer node to assist the media server in distributing the streaming media. The success of P2P networks for streaming media has resulted in a large number of conventional approaches to implementing P2P networks.

For example, conventional P2P schemes referred to as "end system multicast" and "PeerCast" use application-level multicast (ALM) for media streaming. In particular, with both ESM and PeerCast, the peer nodes are self organized into an overlay tree over an existing IP network. The streaming data is then distributed along the overlay tree. The cost of providing bandwidth is then shared amongst the peer nodes, thereby reducing the bandwidth burden (and thus dollar cost) of running the media server. However, with both ESM and PeerCast, the leaf nodes of the distribution tree only receive the streaming media and do not contribute to content distribution.

Two other conventional schemes, "CoopNet" and "SplitStream" address the content distribution limitation of schemes such as ESM and PeerCast by using multiple distribution trees that span the source and the peer nodes. Each tree in CoopNet and SplitStream can then transmit a separate piece of streaming media. As a result, all peer nodes can be involved in content distribution.

Additional examples of conventional P2P media streaming solutions include a streaming scheme referred to as "OStream." OStream uses a "cache-and-relay" approach such that peer nodes can serve clients with previously distributed media from its cache. Another conventional system, "GnuStream" provides a receiver driven P2P media streaming system built on top of the well known "Gnutella" system. Yet another conventional scheme, referred to as "CollectCast" actively looks for serving peers that are most likely to achieve a best streaming quality, while dynamically adapting to network fluctuations and peer failures.

Another type of conventional scheme provides a type of distributed file sharing where pieces of a file are widely distributed across a number of peers. Then whenever a client requests a download of that file, that request is serviced from a plurality of peers rather then directly from the server. For example, one such scheme, referred to as "Swarmcast," spreads the load placed on a web site offering popular downloadable content by breaking files into much smaller pieces. Once a user has installed the Swarmcast client program, their computers automatically cooperate with other users' computers by passing around (i.e., serving) pieces of data that they have already downloaded, thereby reducing the overall serving load on the central server. A similar scheme, referred to as "BitTorrent," works along very similar principles. In particular, when under low load, a web site which serves large files using the BitTorrent scheme will behave much like a typical http server since it performs most of the serving itself. However, when the server load reaches some relatively high level, BitTorrent will shift to a state where most of the upload burden is borne by the downloading clients themselves for servicing other downloading clients.

Unfortunately, while schemes such as Swarmcast and BitTorrent are very useful for distributing pieces of files for dramatically increasing server capacity as a function of the P2P network size, these systems are not adapted for efficiently streaming media. In particular, schemes such as Swarmcast and BitTorrent do not care about the order or timing of the delivery of data packets constituting the file or files being downloaded. The files are simply broadcast in pieces from various peers to a client, and then simply locally reassembled in the correct order to reconstruct the original file on the client computer. However, in the case of streaming media, the timing and order of data packets must be carefully considered and controlled so as to provide for efficient streaming of that media.

Therefore, what is needed is a system and method for receiver-driven control of media streaming from a collection of loosely coupled peers to a client. Such a system should not require communication or collaboration between peers. Further, such as system and method should minimize computation demands placed onto peers by requiring the client to perform the bulk of any necessary computational operations.

SUMMARY

A "PeerStreamer," as described herein provides receiver-driven peer-to-peer (P2P) media streaming for loosely coupled P2P networks. Peers in the network perform only simple operations, may cache all or part of the streaming media, do not collaborate with other peers, may be unreliable, and may drop offline or come online during any given streaming session. Clients (or receivers) in the network operate in real-time to coordinate peers, stream media from multiple peers, perform load balancing, handle online/offline states of peers, and perform decoding and rendering the streaming media.

Note that while the PeerStreamer system described herein is applicable for use in large P2P networks with multiple clients and peers, the following description will generally refer to individual clients for purposes of clarity of explanation. Those skilled in the art will understand that the described system and method offered by the PeerStreamer is applicable to multiple clients. In addition, as the peers described herein are used to serve the media to the receiver or client, the cluster of peers in the P2P network are generally referred to herein either as peers, or as "serving peers." It should also be noted that these "serving peers" should not be confused with "media servers," as described herein, from which particular streaming media files initially originate.

In general, the PeerStreamer provides receiver-driven media streaming. PeerStreamer operations begin with each receiving client retrieving a list of nearby peers that hold all or part of the requested streaming media. Note that in this context, a media server can also act as one of the serving peers. This list includes the IP addresses and the listening ports of a set of one or more neighbor serving peers that hold a complete or partial copy of the serving media. Methods for retrieving this list include: 1) retrieving the list directly from the media server; 2) retrieving the list from a known serving peer; and 3) using a distributed hash table (DHT) approach for identifying the serving peers.

Once the client has retrieved the list of available serving peers, the client connects to each serving peer and obtains its "availability vector." In general, the availability vector for each serving peer is a compact description of the exact portion of the media held by that serving peer. These availability vectors are then used by the client to determine exactly what blocks of the encoded media are held by the various serving peers.

For example, where a particular serving peer holds the entire serving media the availability vector of that peer can be a single flag that indicates that the serving peer holds a complete media copy. Similarly, if the serving peer holds only a portion of the serving media, the availability vector of that serving peer will signal to the client what portion of the media is held by the serving peer, e.g., the number of blocks of each packet and the block indexes that are held by the serving peer.

Further, where additional coding is used, such as the erasure coding techniques described below, the availability vector will include the media erasure coding keys assigned to serving peer, and the number of erasure blocks held by the serving peer. In addition, if the serving peer uses erasure coding and the media is also embedded coded, the availability vector will include the assigned media erasure coding keys, the number of erasure blocks of each packet at the different bitrate levels used by the embedded coding.

In general, an encoded media file typically includes a "media header" followed by a number of media packets (i.e., the "media body") representing the encoded media. Given the availability vector, the next step is for the client to retrieve the lengths of the media header and a "media structure" which are derived from the encoded media file to be streamed from the peer cluster. The media structure of a set of packets is simply the packet headers plus the packet bitstream lengths. After these lengths have been retrieved, the client calculates "data unit IDs" of the media header and media structure, and retrieves them from one or more peers in the peer cluster in a collaborative fashion.

Once the media header arrives, the client analyzes the media header, and then configures or initializes whatever audio/video decoders and rendering devices that are needed for decoding and rendering or playing back the specific type of media being streamed (i.e., MPEG 1/2/4, WMA, WMV, etc.) Once this initial setup phase has been completed, the client then proceeds to coordinate ongoing streaming of the media body from the peer cluster as described below.

In particular, given the aforementioned media structure of the particular streaming media, the client calculates data unit IDs of packets of the streaming media (i.e., the media body), and then retrieves those packets one by one. In a related embodiment, the PeerStreamer uses embedded coded media, and the streaming bitrates then vary according to available serving bandwidths and client queue status. In this case, ongoing retrieval of media packets of the media body corresponds to those packets that will provide the minimum rate distortion based on the available bandwidth.

In either case, the client periodically updates the serving peer list, and connects to potential new serving peers. In a tested embodiment, the client checked for potential new serving peers by issuing periodic conventional TCP connect function calls for each potential serving peer. After the client establishes the connection to a new serving peer, it first retrieves the aforementioned availability vector. The new peer may then join the other active peers in the cluster, at the direction of the receiver/client. The client then coordinates the peers, balances the serving load of the peers according to their serving bandwidths and content availability, and redirects unfulfilled requests of disconnected or timed-out peers to one or more of the other active peers. The streaming operation then continues in this manner until the entire streaming media is received, or the streaming operation is stopped by the user.

In one embodiment, the PeerStreamer uses high rate erasure resilient coding to allow multiple serving peers to hold partial media without conflict, such that clients simply retrieve fixed numbers of erasure coded blocks regardless of where and what specific blocks are retrieved. In this case, the received erasure coded blocks are deposited into a staging queue of the client, where the media packet is then assembled. Completely assembled media packets are then sent downstream to be decoded and played back using whatever audio/video decoders and rendering devices have configured or initialized for decoding and rendering or playing back the specific type of media being streamed. In this case, by controlling the length of the staging queue, the length of a request queue, and the length of a compressed audio/video buffer, the client maintains a streaming buffer of some desired period (on the order of about four seconds in a tested embodiment). This combined buffer is then used to combat network packet loss and jitter.

In view of the above summary, it is clear that the PeerStreamer described herein provides a unique system and method for providing receiver-driven media streaming in a P2P network. In addition to the just described benefits, other advantages of the PeerStreamer will become apparent from the detailed description which follows hereinafter when taken in conjunction with the accompanying drawing figures.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings, which form a part hereof, and in which is shown by way of illustration specific embodiments in which the invention may be practiced. It is understood that other embodiments may be utilized and structural changes may be made without departing from the scope of the present invention.

Figure 1:
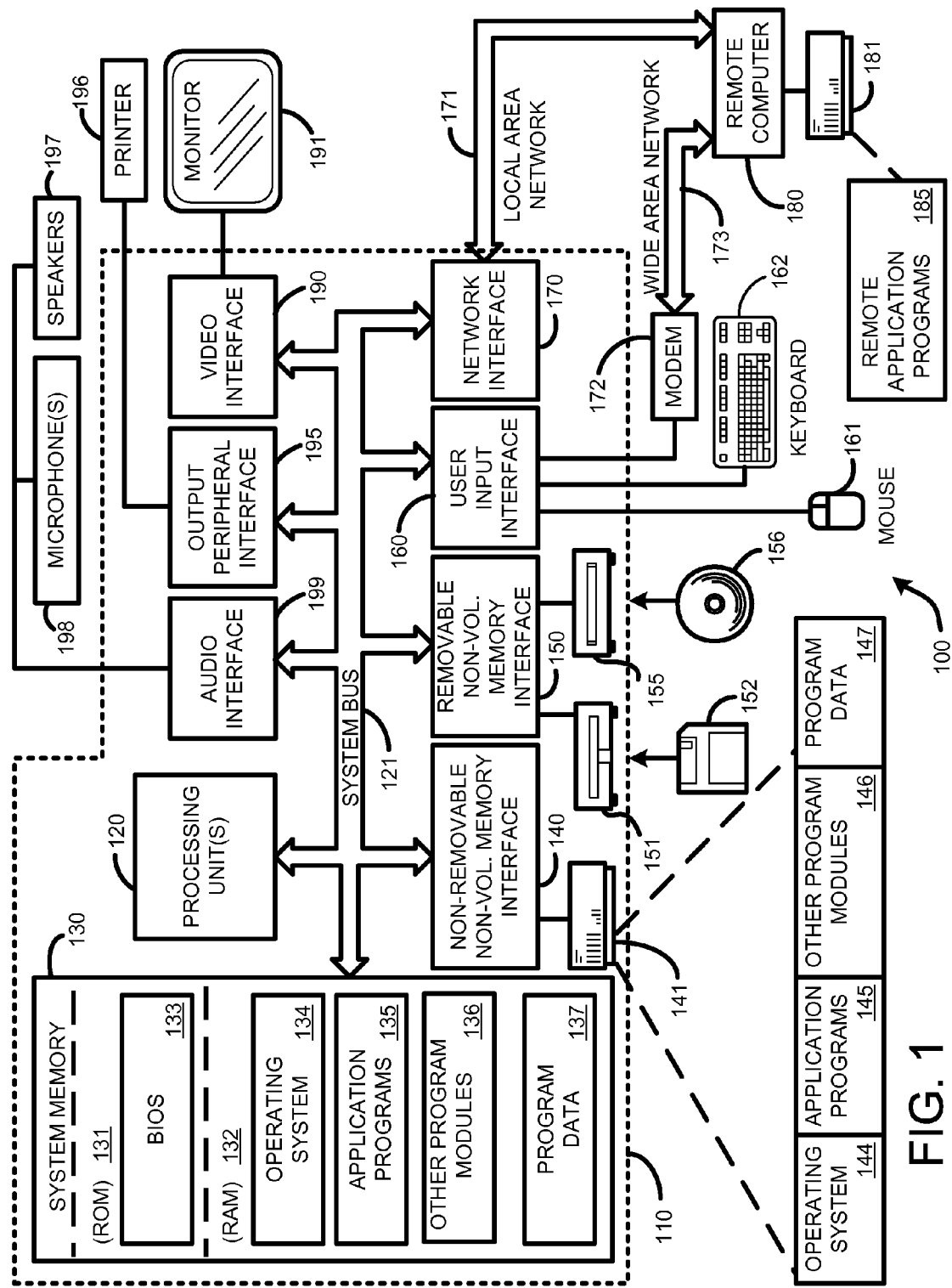
FIG. 1 is a general system diagram depicting a general-purpose computing device constituting an exemplary system implementing a "PeerStreamer", as described herein.

1.0 Exemplary Operating Environment:

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer in combination with hardware modules, including components of a microphone array 198. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. With reference to FIG. 1, an exemplary system for implementing the invention includes a general-purpose computing device in the form of a computer 110.

Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules, or other data.

Computer storage media includes, but is not limited to, RAM, ROM, PROM, EPROM, EEPROM, flash memory, or other memory technology; CD-ROM, digital versatile disks (DVD), or other optical disk storage; magnetic cassettes, magnetic tape, magnetic disk storage, or other magnetic storage devices; or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball, or touch pad.

Other input devices (not shown) may include a joystick, game pad, satellite dish, scanner, radio receiver, and a television or broadcast video receiver, or the like. These and other input devices are often connected to the processing unit 120 through a wired or wireless user input interface 160 that is coupled to the system bus 121, but may be connected by other conventional interface and bus structures, such as, for example, a parallel port, a game port, a universal serial bus (USB), an IEEE 1394 interface, a Bluetooth™ wireless interface, an IEEE 802.11 wireless interface, etc. Further, the computer 110 may also include a speech or audio input device, such as a microphone or a microphone array 198, as well as a loudspeaker 197 or other sound output device connected via an audio interface 199, again including conventional wired or wireless interfaces, such as, for example, parallel, serial, USB, IEEE 1394, Bluetooth™, etc.

A monitor 191 or other type of display device is also connected to the system bus 121 via an interface, such as a video interface 190. In addition to the monitor, computers may also include other peripheral output devices such as a printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining part of this description will be devoted to a discussion of the program modules and processes embodying a "PeerStreamer" which provides dynamic real-time client control over a cluster of one or more peers in a receiver-driven peer-to-peer (P2P) network for distributed media streaming.

2.0 Introduction:

A "PeerStreamer" as described herein provides receiver-driven peer-to-peer (P2P) media streaming for loosely coupled P2P networks. Peers in the network perform only simple operations, may cache all or part of the streaming media, do not collaborate with other peers, may be unreliable, and may drop offline or come online during any given streaming session. Clients in the network operate in real-time to coordinate peers, stream media from multiple peers, perform load balancing, handle online/offline states of peers, and perform decoding and rendering the streaming media.

Note that while the PeerStreamer system described herein is applicable for use in large P2P networks with multiple clients and peers, the following description will generally refer to individual clients for purposes of clarity of explanation. Those skilled in the art will understand that the described system and method offered by the PeerStreamer is applicable to multiple clients. In addition, as the peers described herein are used to serve the media to the receiver or client, the cluster of peers in he P2P network are generally referred to herein either as peers, or as "serving peers." It should also be noted that these "serving peers" should not be confused with "media servers," as described herein, from which particular streaming media files initially originate.

Figure 2:
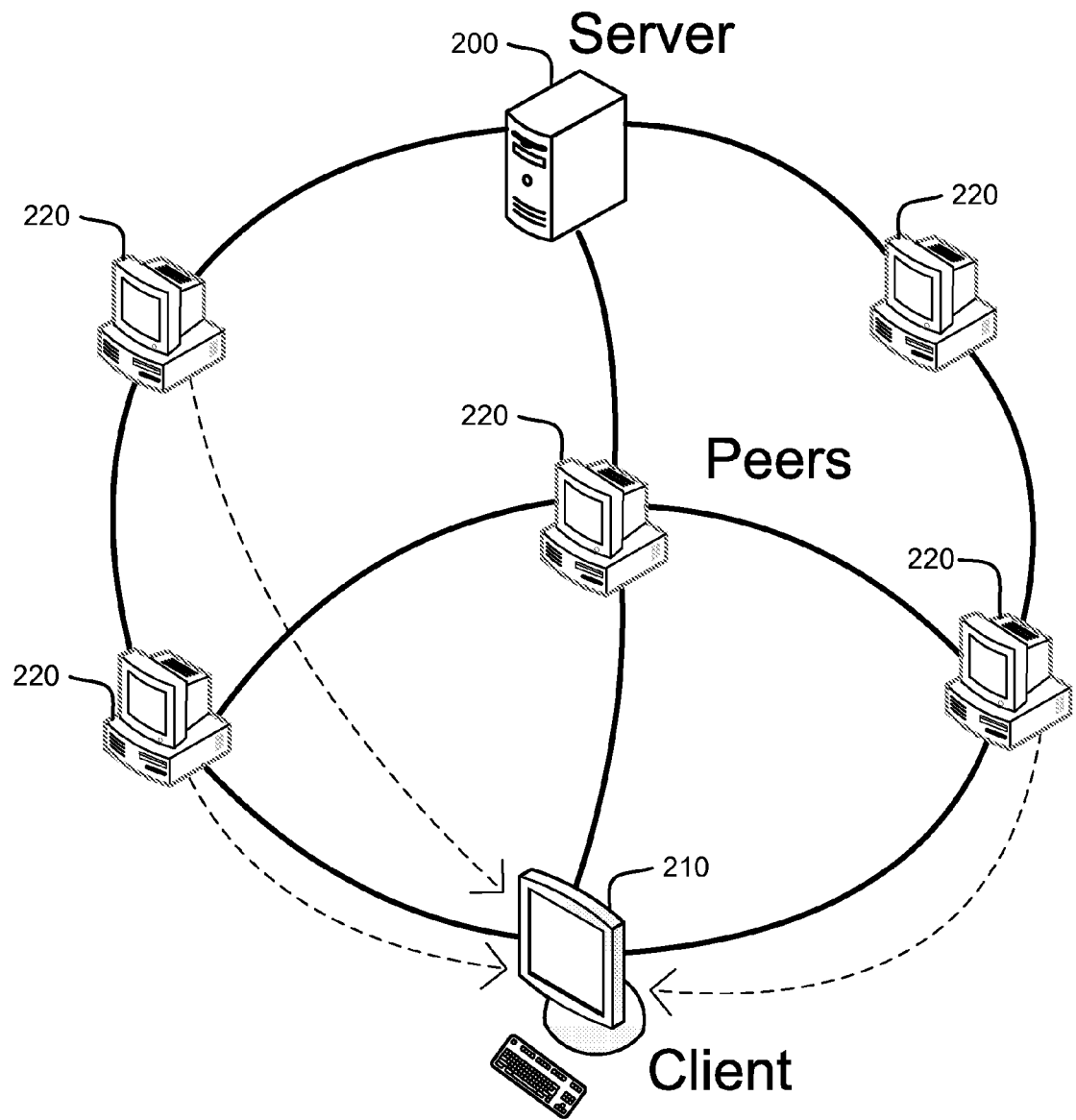
FIG. 2 illustrates an exemplary peer-to-peer (P2P) network for receiver-driven media streaming, as described herein.

In general, the PeerStreamer operates in a P2P network such as the network illustrated by FIG. 2. For a particular streaming session, a "server" 200 is defined as a node in the P2P network that initially originates the streaming media; a "client" (or receiver) 210 is defined as a node that currently requests the streaming media; and a "serving peer" 220 is defined as a node that serves the client with a complete or partial copy of the streaming media.

In general, the server 200, the client 210 and the serving peers 220 are all end-user nodes connected to a network such as the Internet. Because the server 200 is always capable of serving the streaming media, the server node also acts as a serving peer 220. The server node 200 can also perform media administrative functionalities that cannot be performed by a serving peer 220, e.g., maintaining a list of available serving peers, performing digital rights management (DRM) functionality, etc. In addition, as with conventional P2P schemes, the PeerStreamer described herein benefits from increased efficiency as more and more streaming peer nodes 220 are deployed. In particular, as the number of streaming peer nodes 220 increases, the load on the media server 200 will decrease, thereby becoming less costly to run, while each client node 210 will be able to receive much better media quality during a particular media streaming session.

In addition, it should be clear that as with many other P2P type networks, the role of particular nodes may change. For example, a particular node may act as the client 210 in one particular streaming session, while acting as a serving peer 220 in another session. Further, particular nodes can simultaneously act as both client nodes 210 and servers 200 or serving peers 220 to simultaneously stream one or more media files, or portions of media files, while receiving other streaming media from one or more other serving peers.

During a streaming session, the client 200 first locates a number of close-by peers 220 that hold some or all of the desired media, and then streams the media from the multiple peers (which may include the server 200). Consequently, each serving peer 220 acts to assist the server 200 by reducing the overall upload burden by servicing a portion of the download request of the client 210. As a result, the client 210, especially in the case where there are many clients, can often receive much better streaming media quality, as there is a significantly higher serving bandwidth available when there are many streaming peers 220 to assist the server 200.

As with any P2P network, each individual peer 220 does not directly benefit from serving one or more clients 210. However, in one embodiment, a conventional P2P "fairness mechanism" is used to ensure that cooperating peers 220 receive higher priority in being served for subsequent streaming requests than another peer that has not equally cooperated in acting as a serving peer. Consequently, when implementing such a fairness mechanism with the PeerStreamer, a cooperating peer 220 can typically expect better media quality the next time it becomes a client 210.

Consequently, recognizing the fact that each serving peer 220 is effectively performing a favor for both the client 210 and the server 200 during any particular streaming session, a good design philosophy is to ensure that the serving peer is lightweight and the P2P network is loosely coupled. In other words, the serving peer 220 should only need to perform very simple operations with low CPU load. Further, in one embodiment, serving peers 220 can also elect to cache only part of the media, so as to minimize the storage space that is essentially donated by each serving peer. In addition, to reduce any bandwidth cost of communications between peers 220, each serving peer should not be required to collaborate with other peers. Finally, other programs running on any particular serving peer 220 may have a higher priority in claiming the CPU and network resources at any particular point in time, or a particular peer may simply be turned on or off at any time. As a result, particular serving peers 200 may be unreliable, with a fluctuation in available serving bandwidth. In fact, particular serving peers may simply drop offline, or come online, at any time during a streaming session.

Conversely, it is fair to increase the burden on the client 210 to devote resources to the streaming session. In particular, the client 210 needs to receive the streaming media from multiple peers 220, so it is connected to the peers already. Further, there is a motivation for the client 210 to effectively coordinate or manage the peers 200 so as to improve its own streaming experience. Consequently, the PeerStreamer system and method described herein makes use of receiver-driven control over the serving peer in a loosely coupled P2P network wherein the client is responsible for sending and coordinating packet requests among the various streaming peers.

2.1 System Overview:

As noted above, the PeerStreamer described herein provides a system and method for receiver-driven peer-to-peer (P2P) media streaming for loosely coupled P2P networks. Peers in the network perform only simple operations, may cache all or part of the streaming media, do not collaborate with other peers, may be unreliable, and may drop offline or come online during any given streaming session. Clients (or receivers) in the network operate in real-time to coordinate peers, stream media from multiple peers, perform load balancing, handle online/offline states of peers, and perform decoding and rendering the streaming media.

In general, the PeerStreamer provides receiver-driven media streaming. PeerStreamer operations begin with each receiving client retrieving a list of nearby serving peers that hold all or part of the requested streaming media. Note that in this context, a media server can also act as one of the serving peers. This list includes the IP addresses and the listening ports of a set of one or more neighbor serving peers that hold a complete or partial copy of the serving media. Methods for retrieving this list include: 1) retrieving the list directly from the media server; 2) retrieving the list from a known serving peer; and 3) using a distributed hash table (DHT) approach for identifying the serving peers.

Once the client has retrieved the list of available serving peers, the client connects to each serving peer and obtains its "availability vector." In general, the availability vector for each serving peer is a compact description of the exact portion of the media held by each serving peer. This availability vector is then used by the client to determine exactly what blocks of the encoded media are held by the serving peer.

For example, where a particular serving peer holds the entire serving media the availability vector of that peer can be a single flag that indicates that the serving peer holds a complete media copy. Similarly, if the serving peer holds only a portion of the serving media, the availability vector of that serving peer will signal to the client what portion of the media is held by the serving peer, e.g., the number of blocks of each packet and the block indexes that are held by the serving peer.

Further, where additional coding is used, such as the erasure coding techniques described below, the availability vector will include the media erasure coding keys assigned to serving peer, and the number of erasure blocks held by the serving peer. In addition, if the serving peer uses erasure coding and the media is also embedded coded, the availability vector will include the assigned media erasure coding keys, the number of erasure blocks of each packet at the different bitrate levels used by the embedded coding.

Given the availability vector, the next step is for the client to retrieve the lengths of a "media header" and a "media structure" for the media to be streamed from the peer cluster. After these lengths have been retrieved, the client calculates "data unit IDs" of the media header and media structure, and retrieves them from one or more of the peers in the peer cluster based on the knowing what peer has what packets IDs as a result of having analyzed the availability vector for each serving peer.

Once the media header arrives, the client analyzes the media header, and then configures or initializes whatever audio/video decoders and rendering devices that are needed for decoding and rendering or playing back the specific type of media being streamed (i.e., MPEG 1/2/4, WMA, WMV, etc.) Once this initial setup phase has been completed, the client then proceeds to coordinate ongoing streaming of the media body from the peer cluster as described below. In particular, given the aforementioned media structure of the particular streaming media, the client calculates data unit IDs of packets of the streaming media, and then retrieves those packets one by one from the various peers.

The client then periodically updates the serving peer list (using one of the aforementioned methods for identifying serving peers), and connects to potential new serving peers. In a tested embodiment, the client checked for potential new serving peers by issuing periodic conventional TCP connect function calls for each potential serving peer. After the client establishes the connection to a new serving peer, it first retrieves the aforementioned availability vector. The new peer may then join the other active peers in the cluster, at the direction of the receiver/client. The client then coordinates the peers, balances the serving load of the peers according to their serving bandwidths and content availability, and redirects unfulfilled requests of disconnected or timed-out peers to one or more of the other active peers. The streaming operation then continues in this manner until the entire streaming media is received, or the streaming operation is stopped by the user.

Figure 3:
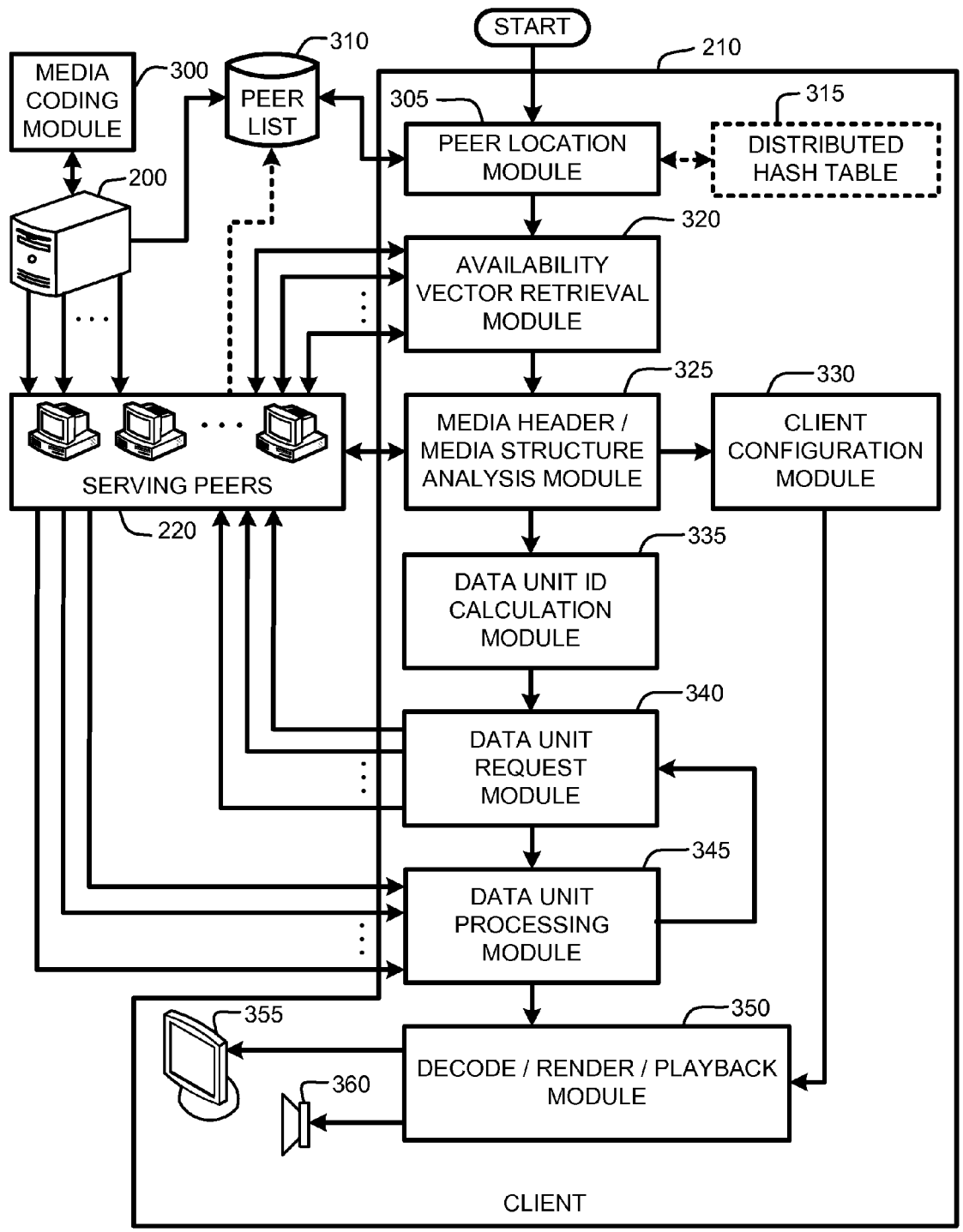
FIG. 3 provides an exemplary architectural flow diagram which illustrates program modules for implementing the PeerStreamer, as described herein.

2.2 System Architectural Overview:

The processes summarized above are illustrated by the general system diagram of FIG. 3. In particular, the system diagram of FIG. 3 illustrates the interrelationships between program modules for implementing a PeerStreamer, as described herein. It should be noted that any boxes and interconnections between boxes that are represented by broken or dashed lines in FIG. 3 represent alternate embodiments of the PeerStreamer described herein, and that any or all of these alternate embodiments, as described below, may be used in combination with other alternate embodiments that are described throughout this document.

In general, the PeerStreamer begins operation with respect each client 210 by having the client retrieve use a peer location module 305 to retrieve or identify a list 310 of nearby serving peers 220 that hold all or part of the requested streaming media. Note that in this context, the media server 200 can also act as one of the serving peers 220. Various methods are used by the peer location module 305 for retrieving the peer list 310. For example, in one embodiment, the peer list 310 is provided directly from the server 200. In another embodiment, the peer list 310 is retrieved from a known serving peer 220. Finally, in yet another embodiment, a conventional distributed hash table (DHT) is used by the peer location module 305 to identify the serving peers 220. As noted above, the peer list 305 includes the IP addresses and the listening ports of one or more neighboring serving peers 220 that hold a complete or partial copy of the serving media.

The serving media itself is encoded by a media coding module 300 existing on the server 200 using any of a number of conventional codecs, including for example, MPEG 1/2/4, WMA, WMV, etc. Note that the codec used to encode the media may be either embedded, or non-embedded, as described in further detail herein. Further, in one embodiment, a "high-rate erasure resilient coding" as described in further detail below is used in combination with any of the codecs to provide for increased robustness to inherently unreliable serving peers 220.

Initially, the encoded media exists only on the server on which that media was originally encoded. It is then distributed, in whole or in part to one or more of the serving peers 220 (again, the server 200 may also act as a serving peer for purposes of media streaming). Distribution to the serving peers 220 is the result of either direct distribution of packets of the media stream to the peers, or as a result of having one or more of the peers that have already streamed that media (when acting as a client 210) simply cache all or part of the media as it is initially streamed to that serving peer. In any case, it is assumed for purposes of explanation that there are a number of known peers (as defined by the peer list 310), and that each peer holds all or part of the encoded media to be streamed.

Once the client 210 has retrieved the list 310 of available serving peers, the client connects to each serving peer 220 via an availability vector retrieval module 320 which retrieves the aforementioned availability vector from each peer. Next, given the information of the availability vector for each peer 320, the client 210 then uses a media header/media structure analysis module 325 to retrieve the lengths of a "media header" and a "media structure" for the media header and the media structure to be streamed from the peer cluster 220. After these lengths have been retrieved, the client 210 client analyzes the media header, and then uses a client configuration module 330 to configure or initialize whatever audio/video decoders and rendering devices that are needed for decoding and rendering or playing back the specific type of media being streamed (i.e., MPEG 1/2/4, WMA, WMV, etc.).

In addition, the media header/media structure analysis module 325 also makes a determination from an analysis of the media structure and media header as to whether either or both embedded coded media or high-rate erasure resilient coding has been used in encoding the media to be streamed.

A data unit ID calculation module 335 is then used to calculate "data unit IDs" for packets of streaming media based on the information included in the media header and media structure. A data unit request module 340 then uses computed data unit IDs to request specific packets or data blocks of the streaming media form various peers in the peer cluster 220.

In the case where the PeerStreamer uses embedded coded media, the streaming bitrates vary according to available serving bandwidths and client queue status, as described in further detail below. In this case, ongoing requests for retrieval of media packets or data units by the data unit request module 340 corresponds to those packets (or data blocks) that will provide the minimum rate distortion based on the available bandwidth. Further, in the additional case where high-rate erasure resilient coding is used, multiple serving peers hold partial media without conflict, such that clients simply retrieve fixed numbers of erasure coded blocks regardless of where and what specific blocks are retrieved.

In any case, as the client 210 retrieves streaming blocks of the media via a data unit processing module 345, the client will either pass those packets to be decoded, as described below, or the data unit processing module will first reconstruct the packets of the media stream from data blocks (see the discussion of high-rate erasure coding below). In addition, the client 210 will periodically update the serving peer list 310 (using one of the aforementioned methods for identifying serving peers). Whenever the list 310 is updated, or at some desired frequency, the client 210 will connect to potential new serving peers to retrieve the aforementioned availability vector. The new peer may then join the other active peers in the cluster 220, at the direction of the receiver/client 210.

The client 210 then coordinates the peers 320, balances the serving load of the peers according to their serving bandwidths and content availability, and redirects unfulfilled requests of disconnected or timed-out peers to one or more of the other active peers. The streaming operation then continues in this manner until the entire streaming media is received and decoded rendered and played back via a decode/render/playback module 350. Note that playback of the decoded media is provided via conventional display devices 355 and/or speakers 360 which are provided their input from the decode/render/playback module 350.

3.0 Operation Overview:

The above-described program modules are employed for implementing the PeerStreamer. As summarized above, the PeerStreamer provides receiver-driven peer-to-peer (P2P) media streaming for loosely coupled P2P networks. The following sections provide a detailed discussion of the operation of the PeerStreamer, and of exemplary methods for implementing the program modules described in Section 2 with respect to FIG. 2. In particular, following the detailed description of the PeerStreamer operation provided below in Sections 3.1 and 3.2, an operational flow diagram is presented in FIG. 10 which summarizes the overall operation of the PeerStreamer in view of that detailed description.

3.1 Operational Details of the PeerStreamer:

The following paragraphs detail specific operational and alternate embodiments of the PeerStreamer described herein. In particular, the following paragraphs describe a "streaming media model" used by the PeerStreamer; a "media structure" of the requested streaming media (basically a "companion file" which defines characteristics of the streaming media needed to compute data ID's for retrieving media packets or "data units"; PeerStreamer data units which represent fixed size portions of media packets for streaming; partial caching of media for reducing storage requirements; high-rate erasure coding of media for increasing robustness of the PeerStreamer system to inherently unreliable serving peers.

3.1.1 Streaming Media Model:

In general, streaming media consists of a stream of packets that are decoded and rendered as they arrive (hence the name streaming). Without streaming, the entire media has to be downloaded in one big chunk before it can be used. The general structure of a streaming media file used by the PeerStreamer is illustrated in FIG. 4.

Figure 4:
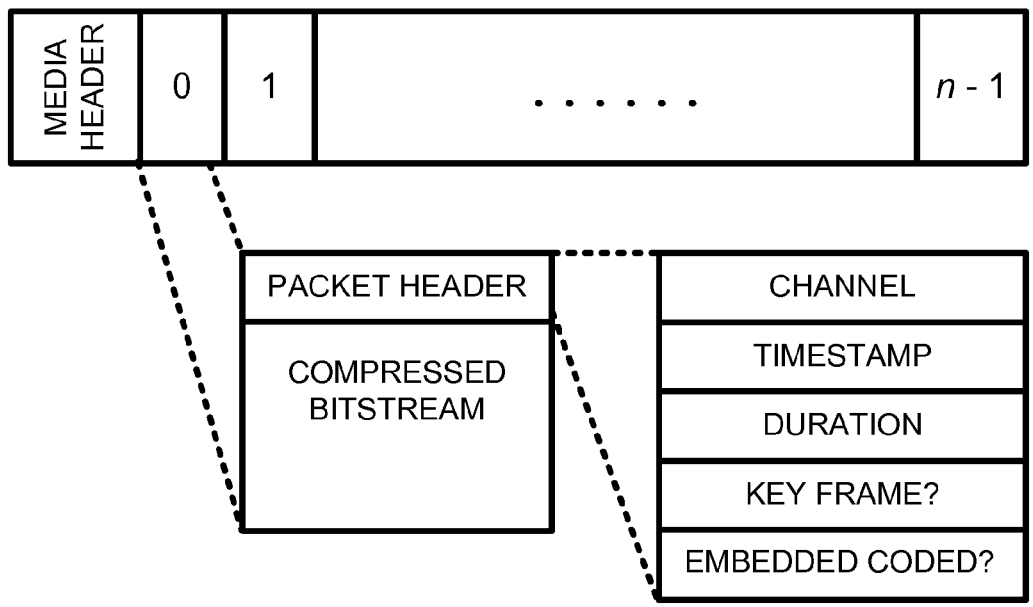
FIG. 4 illustrates a file format of a streaming media file, as described herein.

In particular, as illustrated by FIG. 4, the media is led by a "media header," which contains global information describing the media, e.g., the number of channels in the media, the properties and characteristics (audio sampling rate, video resolution/frame rate) of each channel, codecs used, author/copyright holder of the media, etc. The media header is usually downloaded before the start of the streaming session, so that the client may set up the necessary tools to decode and render the subsequently received packets. Note that streaming media may consist of several channels, each of which is a separate media component that can be independently selected and decoded, e.g., an English audio track, a Spanish audio track, a 4:3 video, a 16:9 video; etc.

The media header is followed by a sequence of media packets, each of which contains the compressed bitstream of a certain channel spanning across a short time period. Each media packet is led by a packet header, which contains information such as the channel index, the beginning timestamp of the packet, the duration of the packet, as well as a number of flags, e.g., whether the packet is a key frame (e.g., an MPEG I frame), whether the packet is an embedded coded packet (with truncatable bitstream), etc. The compressed bitstream of the packet then follows.

Most of the conventional compressed media codecs today, such as MPEG1/2/4 audio/video, WMA/WMV, RealAudio®/RealVideo®, etc., generate non-embedded coded media packets. Consequently, the size of the media packets generated by such systems can not be changed. Moreover, whenever one of the media packets in such a bitstream is lost or overly delayed, the result is either that the media is not decodable, or the playback becomes choppy or intermittent, thereby degrading the playback quality of the streaming media. In order to remain compatible with these conventional codecs, in one embodiment, the PeerStreamer system and method allows media packets to be non-embedded coded (non-scalable). However, in addition to supporting traditional compressed media formats, the PeerStreamer also supports embedded coded media in one embodiment.

With embedded coded media, each media packet is encoded in such a way that it can be independently truncated afterwards. In general, two types of embedded coding are supported by the PeerStreamer, bitplane coding and enhancement layer encoding. Note that both types of embedded coding are well known to those skilled in the art. Consequently, such coding will only be generally described in the following paragraphs.

For example, with bitplane coding, scalable coding of the media blocks is generally achieved by coding a block of audio/video transform coefficients bitplane-by-bitplane, from the most significant bitplane (MSB) to the least significant bitplane (LSB). If the bitstream is truncated after encoding, the information is retained for several of the most significant bitplanes of all the coefficients. Moreover, the truncated bitstream corresponds to a lower bitrate compressed bitstream, which can be considered as embedded in the higher bitrate compressed bitstream, hence the name embedded coding. As a result, the media packet generated by the embedded coder can be truncated, with a graceful rate-distortion trade-off.

With enhancement layer coding, the media content is compressed into a base layer and one or more enhancement layers, each of which typically occupies a separate channel. In particular, such coding allows a minimum quality media stream to be received be subscribing to the base layer. With the addition of each successive enhancement layer, the quality of the decoded media improves. Consequently, with such systems, the receiver or client typically optimizes the quality of received information by subscribing to the base layer, and as many enhancement layers as possible, depending upon available bandwidth.

3.1.2 PeerStreamer Media Structure:

To operate in a receiver-driven mode, the PeerStreamer client needs to know the structure of the to-be-requested media packets, so that it may know what packets and what portion of each packet to request from each peer. This information is provided in a type of "companion file" which includes a definition of the structure of the streaming media to be requested. In general, this media structure provides the PeerStreamer client with a bird's eye view of the entire media (such as, for example, the beginning timestamp of each packet, the duration of each packet, etc.), so that it can plan the P2P streaming session intelligently, and make sure that particular media packets arrive in time for decoding and rendering. Note that the companion file containing the media structure information is initially generated at the time that the media file is originally encoded and is then streamed to the client upon request at the start of each streaming session along with the initial request for the media header. Note that the information in the companion file can also be generated by analyzing the media header and packet header information after the media has been encoded by a conventional codec.

In particular, the media structure of a set of packets is comprised of the packet headers plus the packet bitstream lengths. Consequently, this information can be used by the client to determine which specific packets should be requested, the time that those packets should be requested, and the peer from which those packets should be requested. Consequently, the PeerStreamer first retrieves the media structure of the entire media in a streaming "setup" stage. Retrieval of this information prior to actually streaming the media causes a small delay in the startup of streaming. However, by retrieving this information first, prior to media streaming, there is no additional cost in bandwidth (during media streaming) for serving the media structure information to the client.

Note that aforementioned delay in beginning streaming is typically very small relative to the overall length of the streaming media. For example, in a tested embodiment of the PeerStreamer, five test movie clips ranging from 31 megabytes (MB) to 49 MB in size had media structure companion files in the range of about 37 kilobytes (KB) to about 53 KB. Therefore, the media structure size has been observed to be on the order of about 0.10-0.15% of the overall media body. Therefore, assuming that the serving bandwidths are greater than or equal to the media bitrate, and the media structure is 0.15% of the media body, downloading the media structure of a 10 minute clip causes an additional delay of less than 0.9 s.

In a related embodiment, partial media structures are generated for sequential media segments of some predetermined length (i.e., 10 seconds, 30 seconds, 1 minute, etc.). Each partial media structure is then only retrieved before the corresponding media segment is to be streamed in the near future. This slightly increases bandwidth requirements since media structure requests and transmissions may coexist with media packet requests and transmissions. However, since the size of the media structure is so small in this case, the effect on overall bandwidth requirements is typically negligible.

3.1.3 PeerStreamer Data Units:

In one embodiment, the PeerStreamer breaks the media packet, the media header and the media structure into fixed size data units of length L. The reason for using fixed size data units is that the PeerStreamer client and the serving peers can then pre-allocate memory blocks of size L, thus avoiding costly memory allocation operations during the streaming process. Further, splitting the media packets (potentially very large) into small fixed size data units also allows the PeerStreamer client to distribute the serving load to the peers with a smaller granularity, thereby achieving better bandwidth load balancing among the peers.

In general, a splitting of a length P packet (which can be the media packet, the media header or the media structure) into blocks of size L is achieved by splitting each packet into $\lceil P/L \rceil$ data units, where $\lceil x \rceil$ is a conventional ceiling function that returns the smallest integer that is larger than or equal to x. All data units then have a fixed length L, except potentially the last data unit of each packet, which is of length P mod L.

In the case where non-embedded coding of the media is used, the data units comprising each media packet cannot be dropped during the network transmission without loss of media playback quality. These data packets are therefore designated as "essential data units," as they must all be received.

Conversely, when an embedded coded media packet is split into data units, only the base layer data unit must be delivered, the remaining data units may be optionally dropped if the serving bandwidths are not sufficient. These optional data units are designated as "non-essential data units." The bandwidth required for the serving of the non-essential data units can be calculated as follows. For example, in the case of embedded coding, a media packet will last T seconds. Assuming the media packet is split into a number of data units, in order to serve the data unit at layer i to the client, all data units below layer i must also be served to the client. As a result, the serving bandwidth required to serve the data unit at layer i is:

$$R_i = (i+1)L/T \quad \text{Equation 1}$$

Therefore, Equation 1 provides the bitrate R of the data unit when respect to embedded coded media. The PeerStreamer client then adjusts to changing serving bandwidths by dropping non-essential data units that would result in a bitrate above the available serving bandwidth.

Figure 5:
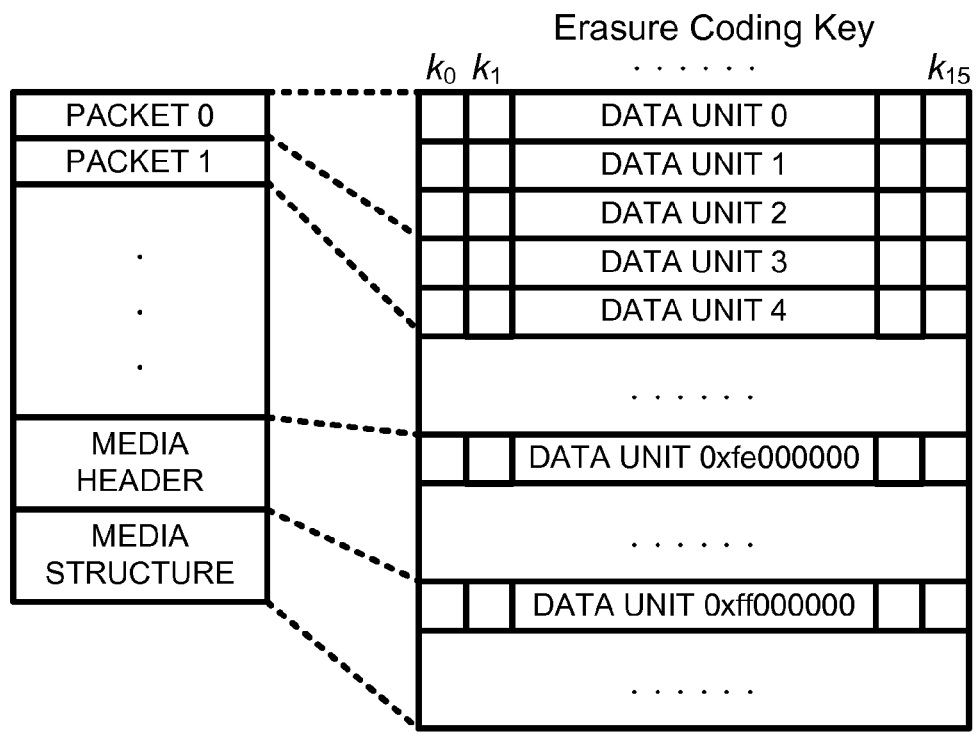
FIG. 5 illustrates "data units" used in a tested embodiment of the by the PeerStreamer, as described herein.

In either case, whether the media is non-embedded coded or embedded coded, all data units of a particular media steam, including the data units of the media packet, the media header and the media structure, are mapped into a unique ID space. For example, in a tested embodiment, the data units of the media packets were indexed from 0x00000000 to 0xfdffffff (Hexadecimal), the data units of the media header from 0xfe000000-0xfeffffff, and the data units of the media structure from 0xff000000-0xffffffff. The data units used in this tested embodiment are of the PeerStreamer are illustrated in FIG. 5.

Note that to obtain the data unit IDs of the media header and the media structure, the lengths of the media header and the media structure are first needed. These are referred to as their "mega-structure." To obtain the data unit IDs of the media packets, the lengths of the media packet bitstream is needed. This information is included in the media structure.

3.1.4 Partial Caching of Media:

For serving purposes, each serving peer only needs to hold a portion of the media that is proportional to its serving bandwidth. Frequently, the serving (or upload bandwidth) of most computers connected to the Internet is substantially less than its download bandwidth (which dictates the highest streaming bitrate that each particular node may receive). Consequently, each end-user node on the Internet tends to have an imbalance between its upload bandwidth and its download bandwidth. For example, given a node on a typical commercial ADSL/cable modem network available to home users, it is not uncommon for the download bandwidth to be an order of magnitude higher than its upload bandwidth. Similarly, nodes on a campus/corporate network typically have capped serving bandwidths so that the participation of any given node in P2P type activities will not affect other mission-critical functions.

Consequently, since each serving peer is not typically individually capable of serving an entire media stream to a client, there is no need to cache the entire media stream on any one serving peer. Therefore, an effective way to decrease the amount of storage resources required by any of the serving peers is to allow each serving peer to hold only a portion of the media that is to be streamed. For example, if the bitrate needed to stream non-embedded coded media is R, and the maximum serving bandwidth provided by a peer in a streaming session is B, each peer node only needs to keep p portion of the streaming media in its cache, where the value p is denoted by Equation 2:

$$p = \max(1.0, B/R) \quad \text{Equation 2}$$

For example, assuming that the media bitrate is twice the serving bandwidth, i.e., R=2B. Then the serving peer only needs to keep half of the streaming media in its storage since that peer alone can not serve the client at the full streaming bitrate. In fact, given the aforementioned limitations of this example, the best that the peer can do is to supply at most half the media. Consequently, the peer only needs to keep half of the media in its cache. The rest of the media to be streamed must then be supplied by the other serving peers.

Figure 6:
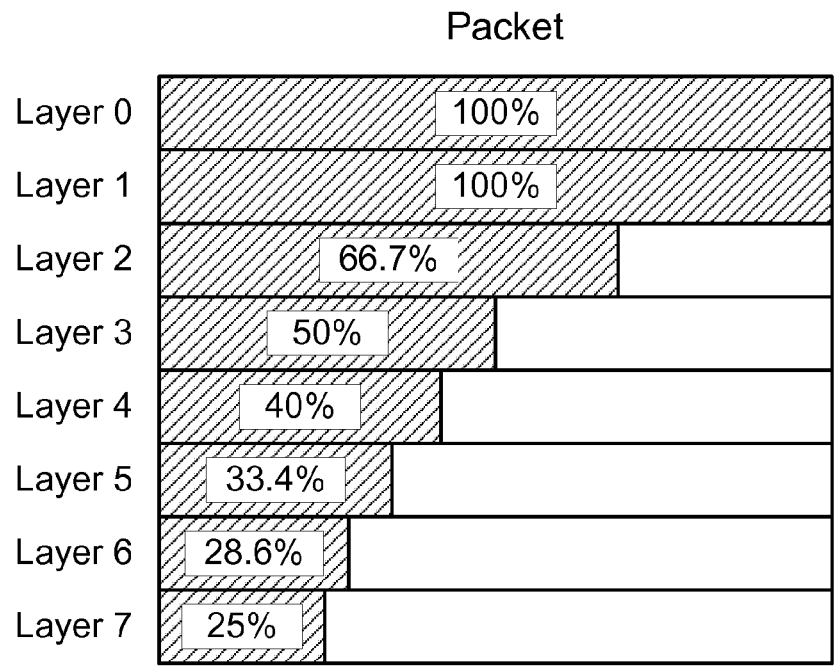
FIG. 6 illustrates partial caching of an embedded coded media packet that has been split into 8 data units, as described herein.

Further, it should then be noted that a combination of Equations 1 and 2 then allows for a determination of the amount of amount of media to keep for the case where embedded coded media is used. As discussed above in Section 3.1.3, the media packets of the embedded coded media are split into a number of data units with different bitrates. Therefore, With R being the bitrate of the data unit for a particular layer L, Equation 2 now gives the portion of the media to be kept for that data unit. For example, as illustrated by FIG. 6, an embedded media packet can be split into a plurality of data units (8 in this example). The amount of media that needs to be cached for each data unit (with L/T=0.5B) is shown then determined in accordance with Equation 2, as illustrated by in FIG. 6.

However, in one embodiment, where a storage resources of a particular serving peer is sufficiently large, the serving peer may elect to cache a larger portion of the media by simply using a higher "potential serving bandwidth," B', in Equation 2. The extra portion of the media cached then enables the media to be served in a choppy, yet high quality fashion. For example, assuming that each serving peer elects to use a potential serving bandwidth B' of twice of its actual serving bandwidth, i.e., B'=2B, the resultant amount of media in the P2P network will be enough for the client to retrieve the media at half the streaming rate. In other words, assuming that the aggregated serving bandwidths of all the available peers are larger than R/2, the client should be able to first download half the media, then continuously stream and playback the remaining half. Similarly, the client can also elect to download a $T_s/2$ segment of the media (with time $T_s$), continuously stream another $T_s/2$ segment and playback the segment, then download and stream another segment. The streaming media may thus be played back at rate R, albeit in a choppy fashion.

3.1.5 High-Rate Erasure Coding of Media:

As noted above, peers may be inherently unreliable. Consequently, it is advantageous to provide some means for providing increased redundancy in the PeerStreamer system and method so as to effectively handle the inherently unreliable serving behavior of serving peers. Dealing with this issue raises a number of concerns that must be addressed. For example, a determination of which portion p of the media should be kept by each peer is of concern. Further, since the media is ultimately split into the aforementioned data units, a determination of which portion p of the data units should each peer maintain is also of concern.

One strategy to address these issues is to simply separate each data unit into k blocks. The peer keeping p portion of the media may then randomly hold $\lceil k \cdot p \rceil$ blocks, with $\lceil x \rceil$ being the aforementioned ceiling function. However, one problem with the randomness of this scheme is that even if there are many more than k blocks available in the peer cluster, it is possible that the cluster as a whole may lack a particular block j, thereby rendering the entire data unit irretrievable. Further, in such a scheme, the client is still responsible for locating each and every distinct block from the peers, which complicates the design of the protocol between the client and the peers.

Consequently, a better strategy is to use a "high rate erasure resilient code" to ensure that one or more of the peers will have the data blocks necessary to reconstruct particular data units while simplifying the demand on the client to identify which of the peers contains the necessary data. In general, an erasure resilient code is a block error correction code with parameters (n, k), where k is the number of original messages, and n is the number of coded messages. High rate erasure resilient code satisfies the property that n is much larger than k, thus the k original messages are expanded into a much larger coded message space of n messages. While erasure coding techniques are in general fairly well known for coding data, the application of such techniques for streaming media in a P2P network environment, as described herein, are not known.

As a block error correction code, the operation of the high rate erasure resilient code can be described through a matrix multiplication over the Galois Field $$\begin{bmatrix} c_0 \\ c_1 \\ \vdots \\ \vdots \\ c_{n-1} \end{bmatrix} = G \begin{bmatrix} x_0 \\ x_1 \\ \vdots \\ x_{k-1} \end{bmatrix}, \quad \text{Equation 3}$$

where p is the order of the Galois Field, $\{x_0, x_1, \ldots, x_{k-1}\}$ are the original messages, $\{c_0, c_1, \ldots, c_{n-1}\}$ are the coded messages, and G is the generator matrix. Note that Equation 3 is not used to generate all of the coded messages at once. Instead, the generator matrix G defines a coded message space. Therefore, when the client receives k coded messages $\{c'_0, c'_1, \ldots, c'_{n-1}\}$, they can be represented by Equation 4 as:

$$\begin{bmatrix} c'_0 \\ c'_1 \\ \vdots \\ c'_{k-1} \end{bmatrix} = G_k \begin{bmatrix} x_0 \\ x_1 \\ \vdots \\ x_{k-1} \end{bmatrix}, \quad \text{Equation 4}$$

where $G_k$ is a sub-generator matrix formed by the k rows of the generator matrix G that correspond to the coded messages. Further, if the sub-generator matrix $G_k$ has full rank k, then the matrix $G_k$ can be inversed, and thus the original messages can be decoded.

There are several well known erasure coding technologies that may be used, including, for example, Reed-Solomon erasure codes, tornado codes, and LPDC codes. However, in one embodiment, the PeerStreamer provides a new high rate erasure resilient code based on a modified Reed-Solomon code on the Galois Field $GF(2^{16})$. In this example, the number of the original messages k is 16. The size of the coded message space n is $2^{16}$=65536. Reed-Solomon code is a maximum distance separable (MDS) code. Consequently, any 16 rows of the generator matrix G forms a sub-generator matrix with full rank 16. In other words, the original messages can be recovered from any 16 coded messages. It should be noted that other field sizes, p, may also be used, and that the PeerStreamer is not limited to use of the particular field size described herein. Further, for embodiments using non-MDS erasure coding, it may be necessary to retrieve k'≧k blocks to recover the original message, depending upon the particular erasure coding used. The Reed-Solomon based erasure codes were used, in part, because they are MDS codes, and they can be efficiently encoded and decoded while placing only a small computational overhead onto the CPU of most conventional computers.

With a high rate (n, k) erasure resilient code, each peer node is assigned k keys in the coded message space of n, with each key being the row index of the generator matrix G. The key assignment may be carried out by the server. Further, if the number of peers caching the media is smaller than n/k, it is possible to assign each peer a unique set of keys. As a result, it can be guaranteed that each peer holds distinctive coded messages. While this strategy provides a number of benefits, it still requires a central coordination node (such as the server).

Consequently, in another embodiment, the role of the central coordination node is eliminated by allowing each peer to choose k random keys. If the number of peer nodes is greater than n/k or the key is assigned with no central coordination node, certain peer nodes may hold the same keys. Nevertheless, in most media streaming sessions where the client is connected to m peers, m is usually much smaller than n/k. Therefore, the probability that two serving peers happen to hold the same key, and thus that one key of one of the peers is not useful, is small. However, even if there is key conflict, the client can easily identify such conflicts when it first connects to the peers. In the case where such a conflict is identified, the client simply invalidates one of the duplicated keys for the remainder of the streaming session. Consequently, the client does not need to actually address the key conflict during the streaming process.

For example, assume that S1 and S2 are the erasure coded key spaces of serving peer 1 and serving peer 2, respectively, and that S1={1, 7, 23, 43, 48} and S2={3, 7, 28, 49, 99}. Clearly, key space S1 and S2 are different. However, key 7 is shared by the two key spaces, therefore, serving peer 1 and serving peer 2 may hold an erasure coded block sharing the same key, i.e., key "7". Therefore, prior to requesting particular coded blocks, key "7" is invalidated with respect to one of the serving peers so that the block coded by key "7" is retrieved from only one the peers, thereby avoiding any decoding conflicts caused by duplicate keys. However, it should be noted that in the case where one serving peers goes offline during media streaming operations, particular invalidated coding keys of another serving peer may be revalidated where the offline serving peer was previously in conflict as a result of using one or more duplicate keys.

With (65536, 16) Reed-Solomon code, each data unit is dissected into 16 blocks. Using a set of pre-assigned keys, the peer chooses to cache ⌈16p⌉ erasure encoded blocks, where p is a parameter calculated from Equations 1 and 2. The keys assigned to the peer, and its maximum serving bandwidth B, constitute the aforementioned availability vector of the peer, as the client can determine how many and what erasure coded blocks (by data unit/block ID) are held by the peer by using the information provided by that peers availability vector. Again, the client resolves any key conflicts at the time that each peer is initially connected. During the streaming session, the client can then retrieve any k coded messages from any serving peer nodes, and decode the associated data unit.

Further, it is not necessary to store an entire set of the coded blocks for decoding particular data units on any one serving peer. In other words, the number of blocks held by any particular serving peer for any particular data unit may be less than k. Therefore, rather than waste computing power to compute every coded block for every coding key, in one embodiment, only those coded blocks that are actually being delivered to specific peers are generated. In other words, where j<k blocks are stored on a particular serving peer, only j blocks should be generated for the particular data unit.

3.2 Implementation of PeerStreamer Operations in a P2P Network:

Implementation of the PeerStreamer operations is described in the following paragraphs in view of the preceding discussion of the operational details of the PeerStreamer. In particular, the following paragraphs describe the location of serving peers by the client; setup of client decoding and rendering based on the retrieved media structure; PeerStreamer network connections; streaming bitrate control; PeerStreamer client requests and peer replies; and finally, PeerStreamer request and staging queues.

3.2.1 Locating Serving Peers:

As noted above, the first task performed by the client is to obtain the IP addresses and the listening ports of a list of neighboring serving peers that hold a complete or partial copy of the serving media. Further, this list is also updated during the media streaming session. As explained above, general approaches for obtaining this list include: 1) retrieving the list from the server; 2) retrieving the list from a known serving peer; and 3) using a distributed hash table (DHT) approach for identifying serving peers where neither the media server nor a serving peer is known in advance.

3.2.2 Decoding and Rendering Setup:

After securing the serving peer list, the client attempts to connect to each of the serving peers. Once connected, the client retrieves the availability vector of each peer, and resolves any key conflicts, as described above. Then, the client retrieves the lengths of the media header and the media structure from one of the peers. After both lengths are retrieved, the IDs of the data units of the media header and media structure are constructed. The media header and the media structure can then be retrieved in a P2P fashion as described in further detail in Section 3.2.6. Once the media header is retrieved, the client determines which decoders and renderers should be initialized to decode and render the media as it is streamed to the client.

In a tested embodiment implemented using DirectX™, this setup was accomplished by first constructing a DirectShow™ filter graph from the information provided in the media header. It should be noted that the PeerStreamer described herein is not limited to implementation using DirectX™ functionality, and that the use of DirectX™, and its discussion relative to a tested embodiment, is provided for purposes of explanation only for describing setup of the client computer in decoding rendering the streaming media for client playback.

Figure 7:
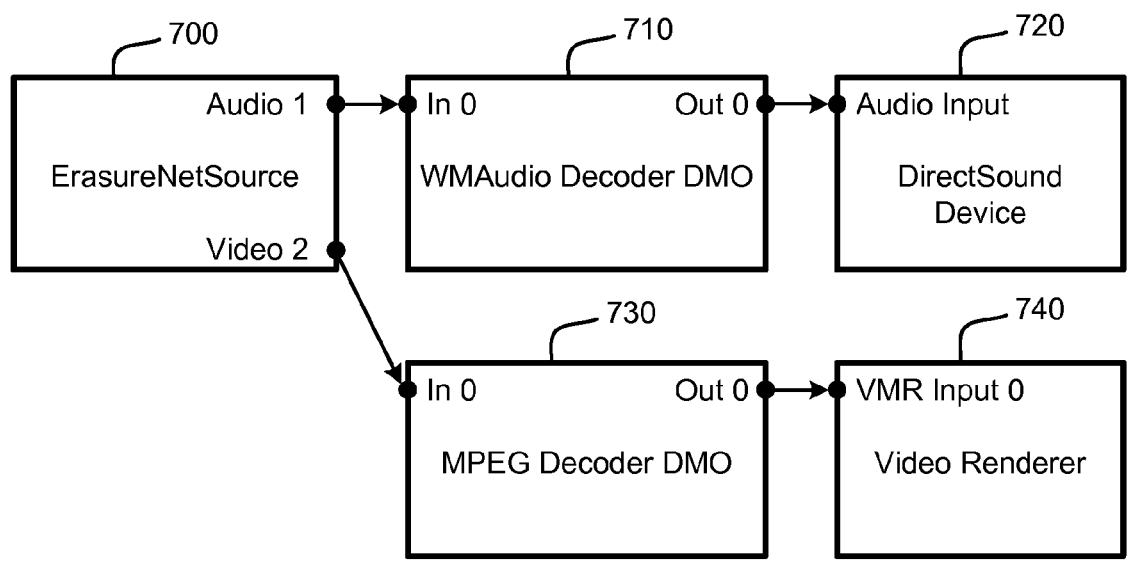
FIG. 7 provides a sample DirectShow™ filter graph of a clients PeerStreamer media streaming session.

Therefore, assuming a DirectX™ implementation for client setup, the network component of the client is represented by a DirectShow™ network source filter, whose output is fed into the proper audio/video decoder DirectX™ media object (DMO). This DMO is then further connected to the appropriate audio/video rendering device. For example, a sample DirectShow™ filter graph of a clients PeerStreamer media streaming session is illustrated by FIG. 7. In this example, the streamed media is non-embedded coded. The audio bitstream is compressed by WMA, and the video bitstream is compressed by MPEG-4.

One advantage of using implementing the PeerStreamer client setup via the DirectShow™ framework is that it may use a huge library of existing audio/video encoders/decoders developed under DirectShow™. For example, with Direct-Show™, the PeerStreamer client is capable of decoding and rendering media coded by a variety of codecs, including, for example, MPEG 1/2/4, WMA/WMV, Indeo Video, etc., or any other codec that has a DirectShow™ decoder DMO component. DirectShow™ also provides additional audio/video processing modules, such as resolution/color space conversion and de-interlacing, so that the decoded audio/video may be automatically matched to the capabilities of the client's audio/video rendering devices.

Further, DirectShow™ automatically handles synchronization of the audio/video tracks. For example, where the audio stream holds a reference clock of the entire stream, when playing a streaming video, DirectShow™ ensures that the system timing clock of the video stream stays as close as possible to the clock of the audio stream for addressing issues such as lip sync. Finally, DirectShow applications are inherently multithreaded. Consequently, on a multiprocessor PC (or one with Hyper-Threading enabled), the computation load of various components of the client, e.g., the network component, the audio decoder, the video decoder, and the audio/video rendering engine, etc., can be distributed onto the multiple processors. This greatly speeds up the execution of the client, and allows more complex audio/video decoders to be used.

Finally, it should again be noted that the PeerStreamer described herein is not limited to implementation using DirectX™ functionality, and that the use of DirectX™, and its discussion relative to a tested embodiment is provided for purposes of explanation only for describing setup of the client computer in decoding rendering the streaming media for client playback.

3.2.3 PeerStreamer Network Link and Packet Loss Management:

Most media streaming clients, such as, for example, Windows® media player or RealPlayer®, use the well known real time transport protocol (RTP), which is carried on top of UDP. The UDP/RTP protocol is typically chosen for media streaming applications because: 1) the UDP protocol supports IP multicast, which can be efficient in sending media to a set of nodes on an IP multicast enabled network; and 2) the UDP protocol does not have any re-transmission or data-rate management functionality. Consequently, the streaming server and client may implement advanced packet delivery functionality, e.g., forward error correction (FEC), to ensure the timely delivery of media packets.

However, in contrast to the well known media streaming schemes identified above, the PeerStreamer uses TCP connections as the network links between the client and the serving peers. One reason for choosing TCP connections rather than conventional UDP/RTP protocols is that IP multicast is not widely deployed in the real world because of issues such as inter-domain routing protocols, ISP business models (charging models), congestion control along the distribution tree and so forth.

In addition, like many commercial media players, the PeerStreamer client incorporates a streaming media buffer (of 4 s in a tested embodiment) to combat network anomalies such as jitter and congestion. In fact, given a streaming media buffer many times larger than the round trip time (RTT) between the client and the serving peer, the TCP ARQ (automated repeated request) mechanism is good enough for the delivery of the media packets in sufficient time to provide smooth playback of the streaming media.

In general, there are three well known mechanisms (with a large number of well known variations) for addressing media packet loss. For example, these mechanisms generally include: FEC, selective packet retransmission, and automatic repeat request (ARQ). Any of these packet loss mechanisms can be used by the PeerStreamer. However, as explained below, there are advantages to using particular mechanisms over others.

In particular, for the Internet channel, which can be considered as an erasure channel with changing characteristics and an unknown packet loss ratio, a fixed FEC scheme either wastes bandwidth (with too much protection) or fails to recover the lost packets (with too little protection). It thus does not efficiently utilize the bandwidth resource between the client and the peer. Therefore, with a streaming buffer many times larger than the RTT, and thus plenty of chances for retransmission, retransmission based error protection (such as selective retransmission and ARQ) is preferable over FEC.

Considering ARQ and selective retransmission, it can be seen that in the Internet channel using the TCP protocol, selective retransmission will have an edge over ARQ only if many packets are not selected to be retransmitted. For non-embedded coded media, a lost packet usually leads to serious playback degradation, including failure to decode and provide playback of particular packets. Therefore, the lost packet is almost always retransmitted. Conversely, with embedded coded media, a lost packet may not prevent the media from playing back. However, the loss of a random packet still causes a number of derivative packets to be not useable. As a result, only the topmost enhancement layer packets may not be selected to be retransmitted.

In comparison to selective retransmission, ARQ always retransmits the packets once they are requested; even they belong to the top most enhancement layer. Nevertheless, the ARQ scheme can choose not to request the top most enhancement layer packets of the following media packets, thus achieving the same bandwidth usage and perceived media playback quality with the selective transmission scheme. Consequently, unless the network condition varies very quickly, the ARQ mechanism employed by the TCP protocol is sufficient to handle the packet loss in media streaming.

Using TCP as the network protocol also provides several additional benefits over conventional media streaming schemes such as those identified above. For example, with TCP, there is no need to deal explicitly with flow control, throughput estimation, congestion control and avoidance, keep alive, etc. All of these issues are handled automatically by the TCP protocol. The TCP protocol can also detect a peer going offline, and gracefully handle the shutdown of the connection link between the peer and the client.

3.2.4 PeerStreamer Streaming Bitrate Control with Embedded Coding:

Non-embedded coded media is preferably always streamed at the bitrate of the media to avoid degradation of media playback at the client. However, the streaming bitrate of embedded coded media may vary during the streaming session.

Therefore, in one embodiment, the streaming bitrate $R_{recv}$ for each embedded coded media packet is first calculated by Equation 5, 6 and 7, as follows:

$$R_{raw} = Th \cdot (1 + T_{rft} - T_{staging}) + B_{staging} - B_{outstanding} \qquad \text{Equation 5}$$

$$R_{filter} = (1-\alpha)R_{filter} + \alpha R_{raw} \qquad \text{Equation 6}$$

$$R_{recv} = \min(R_{min}, R_{inst}) \qquad \text{Equation 7}$$

where Th is the aggregated serving bandwidths of the plurality of serving peers, $T_{staging}$ is a target staging buffer size (with a default of 2.5s in a tested embodiment), $T_{rft}$ is a desired request fulfillment time (with a default of 1.0s in a tested embodiment), $B_{staging}$ is the length of the received packets in the staging queue, $B_{outstanding}$ is the length of outstanding replies to be received, $R_{min}$ is the base layer bitrate (with only essential data units), and $\alpha$ is a low pass control parameter.

The results of Equations 5-7 are then used to control the streaming bitrate $R_{recv}$ by following the aggregated serving bandwidth Th and the staging and request queue statuses, which are described in further detail below in Section 3.2.6. Once the streaming bitrate is determined, the client only issues requests for the data units with a bitrate below the streaming bitrate $R_{recv}$.

In a related embodiment, a more advanced strategy is used to control the bitrate $R_{recv}$ by considering a distortion contribution of the data units as well. However, this requires that the client gains access to the distortion (or the rate-distortion slope) of the data units, which must be included in the media structure and sent to the client. However, unlike existing information in the media structure, the distortion of the data units is not needed in decoding and is thus considered to be additional overhead. Consequently, it is thus a trade-off between the amount of overhead to be sent to the client versus the rate-control accuracy.

Figure 8:
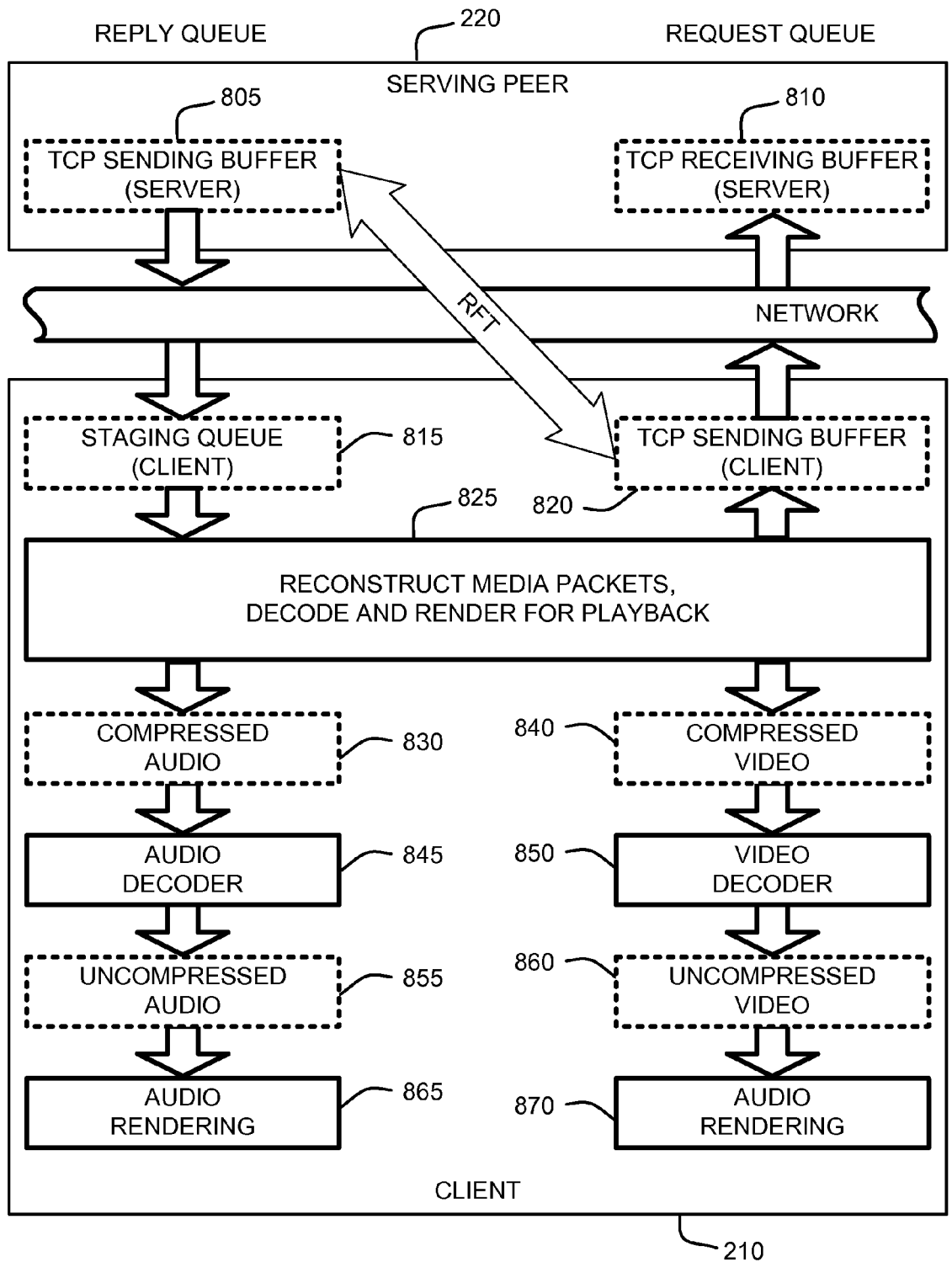
FIG. 8 provides an architectural system diagram representing PeerStreamer request and staging queues and streaming media decoding, rendering and playback, as described herein, with system buffers being illustrated by dashed lines.

3.2.5 PeerStreamer Data Block Requests and Replies:

The life of a client data block request and its reply be the peer is generally illustrated by FIG. 8. In particular, as illustrated by FIG. 8, the client generates the request and sends it through the outbound TCP connection to a particular serving peer. Further, in network delivery, TCP may bundle the request with prior requests issued to the same peer. If a prior request is lost in transmission, TCP handles the retransmission of the request as well.

After the packet request is delivered to the peer, it is stored in the TCP receiving buffer of the serving peer. The peer then processes the requests, one at a time. For each request, the peer reads the requested blocks (which may or may not be erasure coded, depending upon the coding used) from its disk or memory storage, and sends the requested content back to the client. In case the TCP socket from the serving peer to the client is blocked, i.e., no more bandwidth is available, the serving peer will block further client requests until the TCP connection opens up.

The interval between the time that the request is issued by the client and its reply is received by the client is defined as the request fulfillment time (RFT). The request is usually much smaller than its reply, and the operations involved in processing the request, e.g., disk read, are typically trivial compared with the network delivery time used to send the content back. Therefore, the RFT of the request, $T'_{rft}$, is computed by Equation 8, as follows:

$$T'_{rft} = (B_{i, outstanding} + B_{cur})/Th_i \qquad \text{Equation 8}$$

where $Th_i$ is the serving bandwidth of peer i, $B_{outstanding}$ is the length of unreceived replies before the request, and $B_{cur}$ is the length of the content requested. Therefore, RFT is determined as a function of the serving bandwidth of the peer, the size of the request and size of the unreceived content from the peer.

Once the requested content packet arrives at the client, it is immediately moved to a staging queue. In the staging queue, the data blocks (which may include erasure coded blocks) from multiple peers are combined and decoded into the data units, which are further combined into the media packet. Periodically, the client removes the delivered media packets from the staging queue, and pushes them into the corresponding audio/video decoder. After the media packets are decompressed by the decoder, the uncompressed audio/video data streams are sent to the audio/video rendering unit for streaming playback on the client playback devices (display monitor, speakers, etc.).

In one embodiment, the buffers illustrated in FIG. 8 are used to combat network anomalies such as the packet loss and jitter. (However, when using a DirectShow™ implementation, the uncompressed audio/video buffers, are under the control of the DirectShow filter graph and are not programmable). In a tested embodiment of the PeerStreamer, the size of the staging buffer was set to $T_{staging}=2.5s$, the desired RFT was set to $T_{rft}=1.0s$, and the compressed audio/video buffer was set to 0.5s. Consequently, in this tested embodiment, the total buffer of the PeerStreamer client is thus around 4s.

In the embodiment where erasure coding is used, each data block request is formulated as the request of a group of erasure coded blocks of a certain data unit. The erasure coded block group is identifiable with the start block index and the number of blocks requested. The data unit is identifiable through a 32 bit ID. The request is thus in the form of:

$$\text{Data\_Unit\_ID [32], Start\_Index [4], Number\_of\_Blocks [4]} \qquad \text{Equation 9}$$

where the number in the bracket is the number of bits of each component.

Therefore, as illustrated by Equation 9, in the case of erasure coded blocks, each request is 5 byte long. On the other hand, the content requested ranges in size from 128 to 2048 bytes (data unit length L=2048, k=16). As a result, the size of the request is only about 0.24% to 3.91% of the reply. Therefore the amount of the upload bandwidth spent by the client to send the request is thus very small relative to the content requested.

Figure 9:
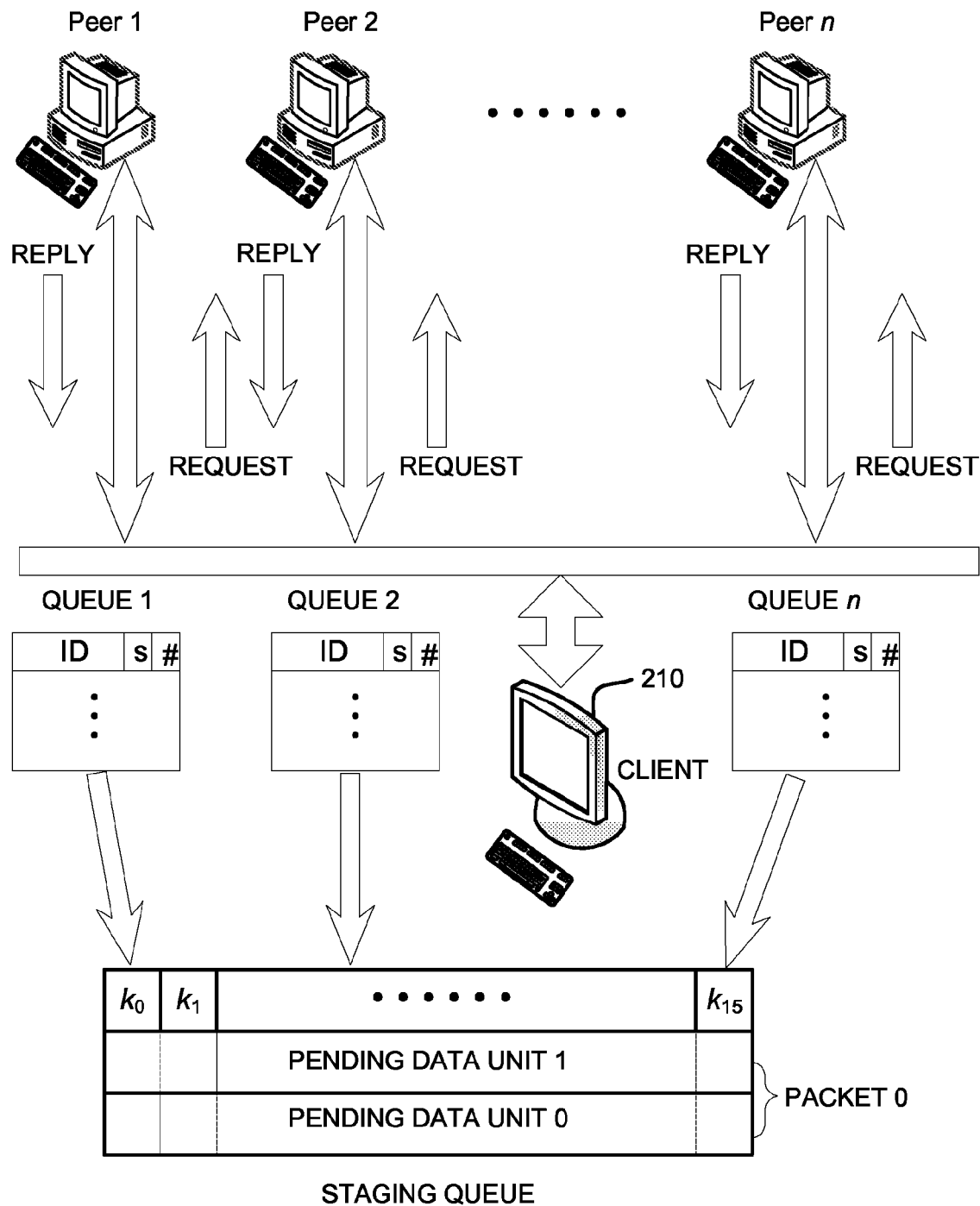
FIG. 9 provides a block diagram illustration of PeerStreamer client staging queues for arriving data units, and PeerStreamer client request queues for each serving peer.

3.2.6 PeerStreamer Request and Staging Queues:

As noted above, the PeerStreamer client maintains a single staging queue to hold received data blocks (which may be erasure coded) and from which the data blocks are assembled into the data units and then into the media packets. The client also maintains a separate request queue for each of the serving peers to hold the unfulfilled requests sent to each peer. One example of these request and staging queues is illustrated by FIG. 9.

The staging queue is the main streaming buffer of the PeerStreamer client. All received contents are first deposited into the staging queue. The request queues serve three purposes: 1) to perform throughput control and load balancing; 2) to identify the reply sent back by each serving peer; and 3) to handle disconnected peers.

The first functionality of the request queue is to balance the load among the serving peers. In the case where the media is erasure coded, the request for a data unit is broken into the requests of multiple groups of erasure coded blocks, with each group directed to one peer. The requests are generated through the following operations. Upon requesting a data unit, the client first checks the availability vector of the peers, and calculates the number of erasure coded blocks ($a_i$) held by each peer for the data unit. If the total number of blocks held by all peers online is less than k, the data unit is irretrievable. If the irretrievable data unit is non-essential (i.e., non-base layer of embedded coded media), the client simply skips the data unit.

Conversely, if the irretrievable data unit is essential, i.e., belongs to a non-embedded coded media packet or the base layer of an embedded coded media packet, the client cannot proceed with download and playback of the streaming media. Therefore, in one embodiment it will wait for more peers to come online to supply the missing blocks. In an alternate embodiment, the client will skip the entire media packet, and mark it as missing to the following audio/video decoder. The result will be a gap or skip in the rendered media. However, if one essential data unit is irretrievable from the peer cluster, it is very likely that more following essential data units will also be irretrievable. Consequently, it is typically better to let the client wait until the data is available so as to provide a better playback experience to the user.

After ensuring that a particular data unit is retrievable, i.e., $$\Sigma_i a_i \geq k \qquad \text{Equation 10}$$

The client checks the space available in the request queue of each peer. It is desirable to maintain the RFT of each peer to be around a system constant $T_{rft}$. In a tested embodiment, $T_{rft}$ on the order of about 1.0s provided good results. (Note that using a too short request queue may not effectively utilize the bandwidth from the client to the peer.)

In particular, in the event that the request packet sent by the client is lost or delayed, the serving peer may be left with nothing to send, which wastes its serving bandwidth. Conversely, using an overly long request queue may prevent the client from quickly adapting to changes, such as the disconnection of one of the peers. Further, with the request queues for all peers being the same length in RFT, the capacity of the request queue becomes proportional to its serving bandwidth: $Th_i \cdot T_{rft}$.

For example, assuming $T_{rft}$ is 1.0s, a peer with serving bandwidth of 16 kbps allows 2 KB of unfulfilled requests pending in its request queue, while a peer with serving bandwidth 1 Mbps allows 128 KB of unfulfilled requests pending. The number of erasure coded blocks that can be requested from a particular peer is thus capped by the space left in its request queue:

$$e_i = \min(a_i, (Th_i \cdot T_{rft} - B_{i,\ outstanding})/bk) \quad \text{Equation 11}$$

where $e_i$ is the number of erasure coded blocks that can be requested from the peer i, and bk is the size of the erasure coded blocks.

Equation 11 guarantees that the client never sends out a request that has an expected RFT greater than $T_{rft}$. If the client cannot find enough current available erasure coded blocks, i.e., $$\Sigma_i e_i < k \quad \text{Equation 12}$$

it will wait until the request queue of the serving peer clears up. The data unit requests are only formed and sent to the peers when $\Sigma_i e_i \geq k$. The actual number of blocks ($b_i$) requested from a certain peer is calculated by:

$$\begin{cases} \Sigma_i b_i = k, \\ b_i = \min(e_i, c \cdot Th_i), \end{cases} \quad \text{Equation 13}$$

where c is a constant that satisfies $\Sigma_i b_i = k$.

In general, the procedure outlined above allocates the serving load to each peer in proportion to its serving bandwidth $Th_i$ (Equation 13). It also ensures that the client does not request more blocks than from a particular serving peer than are actually cached or stored by that serving peer. Finally, this procedure also ensures that the RFT of the request does not exceed $T_{rft}$, as illustrated by Equation 11.

The second functionality of the request queue is to identify the content sent back by each serving peer. As noted above, the PeerStreamer client and peers communicate through TCP, which preserves the order of data transmission, and guarantees packet delivery. Furthermore, each peer processes incoming requests in sequence. As a result, there is no need to specifically identify the content sent back, as it must be for the first request pending in the request queue for each peer.

With respect to the third functionality of the request queue noted above, the request queue is also used to redirect the requests of the disconnected peers. For example, whenever a particular serving peer is disconnected from the client, the disconnection event is picked up by the TCP protocol which then reports this disconnection to the client. The client then dynamically reassigns all unfulfilled requests pending in the queue of the disconnected peer to one or more of the remaining peers. The procedure for reassigning the request is very similar to the procedure of assigning the request in the first place. The only exception is that the number of blocks already requested from the disconnected peer must be considered in the request reassignment.

Finally, whenever erasure coded blocks arrive at the client, they are immediately pulled away from the TCP socket. After pairing the arriving content with the pending request, the fulfilled request is removed from the request queue. The identified erasure coded blocks are then deposited into the staging queue. The size of the staging queue increases as a result. If the staging queue reaches a predetermined size $T_{staging}$, no further requests of the media packets/data units are sent. Once all erasure coded blocks of a certain data unit have been received, the data unit is erasure decoded, and is marked as ready. A media packet becomes ready if all its requested data units are ready. Periodically, the audio/video decoder removes the "ready" media packet from the staging queue. This reduces the size of the staging queue, and may trigger the generation of new media packet requests.

The media streaming operations described above then continue until playback of the media file is completed, or until such time as there are insufficient peers available to stream the media, or a user terminates the streaming session.

Figure 10:
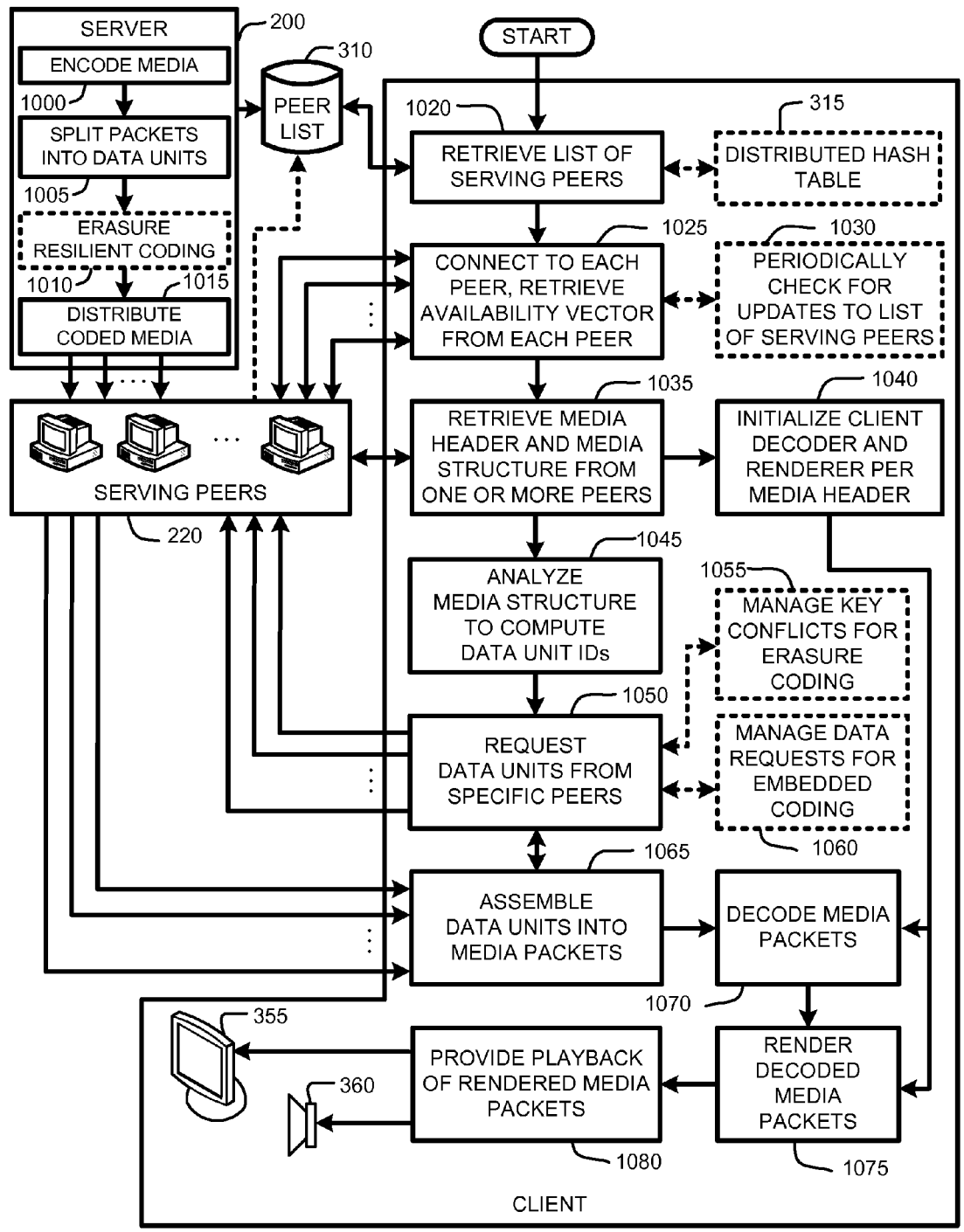
FIG. 10 provides an operational flow diagram which illustrates the general operation of one embodiment of the PeerStreamer, as described herein.

3.3 PeerStreamer Operation:

The processes described above with respect to FIG. 2 through FIG. 9 are illustrated by the general operational flow diagram of FIG. 10. In general, FIG. 10 illustrates an exemplary operational flow diagram showing several operational embodiments of the PeerStreamer. It should be noted that any boxes and interconnections between boxes that are represented by broken or dashed lines in FIG. 10 represent alternate embodiments of the PeerStreamer described herein, and that any or all of these alternate embodiments, as described below, may be used in combination with other alternate embodiments that are described throughout this document.

In particular, as illustrated by FIG. 10, prior to media streaming operations, the server 200 (which may also be one of the peers 220) encodes 1000 the media to be streamed. As described above, the PeerStreamer is capable of operating with any of a number of conventional codecs, such as, for example, MPEG 1/2/4, WMA, WMV, etc. In addition, during the encoding process 1000, the server 200 also generates both the aforementioned media header, and the companion file containing the media structure.

As described above, in one embodiment, once the media is encoded 1000, the encoded media packets are split 1005 into a number of data units of a fixed size. Further, as with the encoded media, the media header and the media structure are also split 1005 into a number of data units of the same fixed size as used to split the encoded media packets. As explained above, splitting 1005 this information into fixed length data units allows for both the client and the serving peers to pre-allocate memory blocks prior to media streaming operations, thereby avoiding computationally expensive memory allocation operations during the streaming process. Further, the use of smaller data units allows for finer control by the client over the exact amount of bandwidth expended by each serving peer to meet client data unit requests during streaming operations.

In addition to splitting 1005 the encoded media, the media header, and the media structure into smaller data units, in one embodiment, an additional layer of coding is used to provide increased redundancy in a typical P2P environment where serving peers are inherently unreliable. In particular, as described above, in one embodiment, the data units are further divided into a number of data blocks using a key-based high rate erasure resilient coding process 1010.

The use of such coding 1010 ensures that one or more of the peers will have the data blocks necessary to reconstruct particular data units while simplifying the demand on the client to identify which of the peers contains the necessary data. Further, as noted above, in one embodiment, the erasure resilient coding keys used by each serving peer 220 are automatically assigned to each peer by the server 200. However, in another embodiment, each serving peer 220 simply chooses an erasure resilient coding key at random. These keys are then included along with the aforementioned availability vector that is retrieved by the client 210 when each peer 220 is initially contacted by the client. In the random key embodiment, the client then invalidates the keys of one or more peers where there is a key conflict for a given data unit.

Once the media has been initially encoded 1000, split into data units 1005, and possibly further erasure coded 1010, the resulting data units or data blocks are then distributed 1015 to the various serving peers 220. This distribution 1015 can be deliberate in the sense that the blocks or packets of the encoded media are simply provided in whole or in part to a number of peers where it is then cached or stored for future streaming operations when called by a client joined to the P2P network.

Alternately, as discussed above, whenever a client 210 streams a particular media file, the recovered media packet is just the media packet after encoding operation 1000. They may be split into data units 1005, and possibly further erasure coded 1010, and the client may maintain at least a portion of the content that was streamed to it, possibly within local memory or storage. The client is then identified as a serving peer 220 (in the aforementioned peer list 310) for future streaming operations. One advantage to this embodiment is that while the number of peers containing portions of a particular media file is initially low, thereby increasing demands on the server itself to meet serving requests, as time passes and more clients stream the media, those client will then be able act as peers for later streaming requests. Consequently, there is no need to explicitly select serving peers 220 to hold an initial cache of all or part of the media to be streamed. As a result, any demands on the server are further lessened with respect to trying identifying peers willing to accept an initial cache of media to be streamed.

In either case, once the media has been distributed 1015 to the serving peers 220, the client 210 then is ready to begin streaming requests to those serving peers. Further, as noted above, the server 200 can also act as a serving peer 220 for the purposes of streaming to the client 210. Again, in view of the above discussion, it should be clear that while initial streaming of a particular media file may require greater server 200 involvement, as time passes, and more clients 210 stream that media (and are then available to act as serving peers), the demands on the server to actually act as a serving peer are reduced, or even eliminated.

At this point, the client 210 begins a streaming session by first retrieving the list 310 of available serving peers 220. As described above, this list 310 is retrieved directly from the server 200, from one of the peers 220, or by using a conventional DHT method 315 for identifying potential serving peers. Once the client 210 has retrieved the peer list 310, the client then connects to each serving peer 220 and retrieves 1025 the availability vector from each peer. Further, in one embodiment, the client 210 periodically checks for updates 1030 to the peer list 310 during ongoing streaming operations. One advantage of performing such periodic checks 1030 is that in a large P2P network, it is probable that multiple serving peers are coming online and going offline at any given point in time. Consequently, ensuring that the client 210 has an updated peer list 310 will allow the client to respond to the loss or degradation of a peer 220 that is currently streaming media to the client. Whenever a periodic check 1030 of the list 310 indicates the addition of a new peer 220 to the list, the client 210 again connects to the new peer and retrieves 1025 that new peer's availability vector.

Once the client 210 has retrieved 1025 the availability vector of each peer 220, the client then retrieves 1035 the media header and media structure of the media to be streamed from one or more of the serving peers by requesting data units corresponding that information from one or more of the peers via a network connection between the client and those peers.

As noted above, the media header generally contains global information describing the media, e.g., the number of channels in the media, the properties and characteristics (audio sampling rate, video resolution/frame rate) of each channel, codecs used, author/copyright holder of the media, etc. Consequently, retrieval of the media header at the start of the media streaming session allows the client 220 to set up or initialize 1040 the necessary tools to decode 1070 and render 1075 the subsequently received packets prior to receipt of those packets during the streaming session.

Further, after retrieving 1035 the media structure of the particular streaming media, the client analyzes that media structure and calculates data unit IDs 1045 of data units of the streaming media that will need to be requested during the streaming process. The client 210 then requests those data units 1050, one by one, from one or more of the serving peers 220.

Further, as noted above, in the embodiment where erasure coding is used in combination with random peer selection of coding keys, the client 210 will invalidate duplicate keys on one or more of the peers 220 so as to manage key conflicts 1055. In a related embodiment, the PeerStreamer uses embedded coded media, and the data requests (and streaming bitrates) for each peer 220 are then managed 1060 according to available serving bandwidths and the client 210 queue status. In this case, ongoing requests for data units 1050 correspond to those packets that will provide the minimum rate distortion based on the available bandwidth of the various serving peers. In either case, as noted above, missing or late data units are again requested 1050 from either the same or an alternate peer 220, depending upon whether embedded or non-embedded coding has been used, the connection status of the peers, and the time remaining to request and receive the missing or late data unit.

Finally, once all of the data units constituting a particular media packet have been retrieved in accordance with the client 220 request 1050, those data packets are reassembled 1065 into the original media packet. Reassembled media packets are then decoded 1070, rendered 1075, and provided for playback on either or both a conventional display device 355 or speakers 260.

The foregoing description of the PeerStreamer has been presented for the purposes of illustration and description. It is not intended to be exhaustive or to limit the invention to the precise form disclosed. Many modifications and variations are possible in light of the above teaching. Further, it should be noted that any or all of the aforementioned alternate embodiments may be used in any combination desired to form additional hybrid embodiments of the PeerStreamer. It is intended that the scope of the invention be limited not by this detailed description, but rather by the claims appended hereto.

What is claimed is:

1. A system for providing client-controlled streaming of media files in a peer-to peer (P2P) network, comprising using a computing device to:
store one or more of packets of an encoded media file, said encoded media file comprising a media header and a media body, on one or more serving peers in a cluster of available serving peers, such that every packet of the encoded media file is cached on at least one of the serving peers;
use a client to retrieve a list of serving peers available to the client;
initialize a separate packet request queue on the client for each available serving peer;
send one or more client requests for one or more specific data packets from the client to one or more specific serving peers, and add each request to the corresponding packet request queue;
wherein the client requests sent to any of the serving peers are provided via a reliable and order preserving link to the serving peer, such that the serving peers do not need to identify the data packets sent in reply to the client requests;
remove each request from the corresponding packet request queue when the corresponding data packet is received by the client from a serving peer; and
decode and render the received data packets to provide streaming media playback on the client.

2. The system of claim 1 further comprising downloading an availability vector from each available serving peer to the client, wherein each availability vector describes available data packets stored on each corresponding serving peer, and wherein the client requests for one or more specific data packets are based on the downloaded availability vectors.

3. The system of claim 1 wherein decoding and rendering the received data packets further comprises at least partially buffering the decoded and rendered data packets prior to playback on the client.

4. The system of claim 1 wherein initializing a separate packet request queue on the client for each available serving peer further comprises creating and maintaining additional client packet request queues corresponding to any serving peers which join the cluster of serving peers.

5. The system of claim 1 further comprises moving any data packet requests remaining in the packet request queue corresponding to a serving peer which becomes unavailable to the client to one or more of the other packet request queues, and requesting the corresponding packets from the corresponding serving peer.

6. The system of claim 1 further comprising performing bandwidth load balancing between each of the available serving peers by providing dynamic client management of data packet requests for maintaining a desired request fulfillment time (RFT) across each of the available serving peers.

7. The system of claim 1 wherein the reliable and order preserving link is a TCP communications protocol, and wherein any incoming data packet received by the client from a serving peer corresponds to a first data packet request in the request queue corresponding to the serving peer from which the data packet was received.

8. The system of claim 1 wherein the data packets are embedded coded data packets, and wherein client control is maintained over a streaming bitrate of each embedded coded data packet by automatically limiting the client requests for one or more specific data packets to one or more specific serving peers.

9. The system of claim 8 wherein automatically limiting the client requests is a function of:
an aggregate serving bandwidth of the serving peers;
a client staging buffer size;
a desired request fulfillment time (RFT);
a length of received packets in the client staging buffer;
a length of each packet request queue; and
a base layer bitrate of the embedded coded data packets.

10. A computer-readable medium having stored thereon computer executable instructions for providing client-controlled streaming of media files in a peer-to peer (P2P) network, said computer executable instructions comprising:
storing one or more of packets of an encoded media file, said encoded media file comprising a media header and a media body, on one or more serving peers in a cluster of available serving peers, such that every packet of the encoded media file is cached on at least one of the serving peers;
using a client to retrieve a list of serving peers available to the client;
initializing a separate packet request queue on the client for each available serving peer;
sending one or more client requests for one or more specific data packets from the client to one or more specific serving peers, and add each request to the corresponding packet request queue;
wherein the client requests sent to any of the serving peers are provided via a TCP link to the serving peer, and wherein any incoming data packet received by the client from a serving peer corresponds to a first data packet request in the request queue corresponding to the serving peer from which the data packet was received, such that the serving peers do not need to identify the data packets sent in reply to the client requests; and
removing each request from the corresponding packet request queue when the corresponding data packet is received by the client from a serving peer.

11. The computer readable medium of claim 10 further comprising instructions for decoding and rendering the received data packets to provide streaming media playback on the client.

12. The computer readable medium of claim 10 further comprising instructions for downloading an availability vector from each available serving peer to the client, wherein each availability vector describes available data packets stored on each corresponding serving peer, and wherein the client requests for one or more specific data packets are based on the downloaded availability vectors.

13. The computer readable medium of claim 10 further comprising instructions for performing bandwidth load balancing between each of the available serving peers by providing dynamic client management of data packet requests for maintaining a desired request fulfillment time (RFT) across each of the available serving peers.

14. A method for providing client-controlled streaming of media files in a peer-to peer (P2P) network, comprising performing steps for:
storing one or more of packets of an encoded media file, said encoded media file comprising a media header and a media body, on one or more serving peers in a cluster of available serving peers, such that every packet of the encoded media file is cached on at least one of the serving peers;
using a client to retrieve a list of serving peers available to the client;
initializing a separate packet request queue on the client for each available serving peer;

sending one or more client requests for one or more specific data packets from the client to one or more specific serving peers, and add each request to the corresponding packet request queue;

wherein the client requests sent to any of the serving peers are provided via a reliable and order preserving link to the serving peer, such that the serving peers do not need to identify the data packets sent in reply to the client requests;

removing each request from the corresponding packet request queue when the corresponding data packet is received by the client from a serving peer; and decoding and rendering the received data packets to provide streaming media playback on the client.

15. The method of claim 14 further comprising downloading an availability vector from each available serving peer to the client, wherein each availability vector describes available data packets stored on each corresponding serving peer, and wherein the client requests for one or more specific data packets are based on the downloaded availability vectors.

16. The method of claim 14 wherein initializing a separate packet request queue on the client for each available serving peer further comprises creating and maintaining additional client packet request queues corresponding to any serving peers which join the cluster of serving peers.

17. The method of claim 14 further comprises moving any data packet requests remaining in the packet request queue corresponding to a serving peer which becomes unavailable to the client to one or more of the other packet request queues, and requesting the corresponding packets from the corresponding serving peer.

18. The method of claim 14 further comprising performing bandwidth load balancing between each of the available serving peers by providing dynamic client management of data packet requests for maintaining a desired request fulfillment time (RFT) across each of the available serving peers.

19. The method of claim 14 wherein the reliable and order preserving link is a TCP communications protocol, and wherein any incoming data packet received by the client from a serving peer corresponds to a first data packet request in the request queue corresponding to the serving peer from which the data packet was received.

20. The method of claim 14 wherein the data packets are embedded coded data packets, and wherein client control is maintained over a streaming bitrate of each embedded coded data packet by automatically limiting the client requests for one or more specific data packets to one or more specific serving peers.

* * * * *